(12) United States Patent
Ishiguro

(10) Patent No.: US 8,976,325 B2
(45) Date of Patent: Mar. 10, 2015

(54) VA-MODE LIQUID-CRYSTAL DISPLAY DEVICE

(75) Inventor: Makoto Ishiguro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 150 days.

(21) Appl. No.: 13/512,562

(22) PCT Filed: Nov. 29, 2010

(86) PCT No.: PCT/JP2010/071760
§ 371 (c)(1),
(2), (4) Date: May 29, 2012

(87) PCT Pub. No.: WO2011/065587
PCT Pub. Date: Jun. 3, 2011

(65) Prior Publication Data
US 2012/0236234 A1    Sep. 20, 2012

(30) Foreign Application Priority Data
Nov. 30, 2009    (JP) .................................. 2009-272888

(51) Int. Cl.
G02F 1/1335    (2006.01)
G02F 1/1362    (2006.01)
G02B 5/22    (2006.01)
G02B 5/30    (2006.01)
G02F 1/1337    (2006.01)

(52) U.S. Cl.
CPC ............ *G02F 1/136209* (2013.01); *G02B 5/22* (2013.01); *G02B 5/3083* (2013.01); *G02F 2001/133742* (2013.01); *G02F 2001/136222* (2013.01); *G02F 2201/40* (2013.01); *G02F 2202/40* (2013.01); *G02F 2413/12* (2013.01)
USPC .............................. 349/96; 349/106; 349/110

(58) Field of Classification Search
USPC ............................................ 349/96, 106, 110
See application file for complete search history.

(56) References Cited

U.S. PATENT DOCUMENTS 6,650,390 B2    11/2003    Sakamoto et al.
7,951,430 B2    5/2011    Sugiyama et al.
7,982,826 B2    7/2011    Hirakata et al.

(Continued)

FOREIGN PATENT DOCUMENTS

JP    2001-249350 A    9/2001
JP    2002-341330    11/2002

(Continued)

OTHER PUBLICATIONS

Office Action issued by JPO on Jul. 23, 2013 in connection with corresponding Japanese Patent Application No. 2010-070128.

(Continued)

*Primary Examiner* — Lucy Chien
(74) *Attorney, Agent, or Firm* — Jean C. Edwards, Esq.; Edwards Neils PLLC

(57) ABSTRACT

Disclosed is a VA-mode liquid-crystal display device wherein the total of retardation along the thickness-direction at a wavelength of 550 nm of the color filter layer, $Rth_{CF}(550)$, and retardation along the thickness-direction at a wavelength of 550 nm of the whole rear-side retardation region, $Rth_{rear}(550)$, satisfies following formula (I): (I) $|Rth_{CF}(550)+Rth_{rear}(550)| \leq 90$ nm.

18 Claims, 1 Drawing Sheet

(56) References Cited

U.S. PATENT DOCUMENTS

| | | |
|---|---|---|
| 8,049,850 B2 | 11/2011 | Sugiyama et al. |
| 8,184,244 B2 | 5/2012 | Ueda et al. |
| 2001/0019392 A1 | 9/2001 | Sakamoto et al. |
| 2003/0086041 A1* | 5/2003 | Watanabe et al. ............. 349/122 |
| 2006/0164580 A1 | 7/2006 | Ueda et al. |
| 2007/0029550 A1 | 2/2007 | Yoshida et al. |
| 2008/0158488 A1* | 7/2008 | Yanai et al. .................. 349/107 |
| 2009/0051856 A1 | 2/2009 | Sugiyama et al. |
| 2009/0096966 A1 | 4/2009 | Umemoto et al. |
| 2009/0122243 A1 | 5/2009 | Sugiyama et al. |
| 2009/0128743 A1* | 5/2009 | Akao et al. ..................... 349/75 |
| 2009/0153784 A1 | 6/2009 | Kiya |
| 2009/0207347 A1 | 8/2009 | Shimizu et al. |
| 2010/0220272 A1 | 9/2010 | Ohashi et al. |
| 2011/0058131 A1 | 3/2011 | Ishiguro |
| 2011/0128473 A1 | 6/2011 | Ishiguro |

FOREIGN PATENT DOCUMENTS

| | | | |
|---|---|---|---|
| JP | 2003-156743 | A | 5/2003 |
| JP | 2005-003733 | A | 1/2005 |
| JP | 2005-099499 | A | 4/2005 |
| JP | 2005-258004 | A | 9/2005 |
| JP | 2009-098667 | A | 5/2006 |
| JP | 2006-184640 | A | 7/2006 |
| JP | 2006-234848 | A | 9/2006 |
| JP | 2006-241293 | A | 9/2006 |
| JP | 2007-047202 | A | 2/2007 |
| JP | 2007-133379 | A | 5/2007 |
| JP | 2007-164125 | A | 6/2007 |
| JP | 2007-171577 | A | 7/2007 |
| JP | 2007-212603 | A | 8/2007 |
| JP | 4015840 | B2 | 9/2007 |
| JP | 2007-279083 | A | 10/2007 |
| JP | 2008-015307 | A | 1/2008 |
| JP | 2008-216416 | A | 9/2008 |
| JP | 2009-093166 | A | 4/2009 |
| JP | 2009-139967 | A | 6/2009 |
| JP | 2009-204851 | A | 9/2009 |
| JP | 2009-258640 | A | 11/2009 |
| WO | 2006/070936 | A1 | 7/2006 |
| WO | 2006/093346 | A1 | 9/2006 |

OTHER PUBLICATIONS

International Preliminary Report on Patentability from the International Bureau issued on Jun. 14, 2012 in International Application No. PCT/JP2010/071759.

International Preliminary Report on Patentability from the International Bureau issued on Jun. 14, 2012 in International Application No. PCT/JP2010/071761.

Official Action issued by JPO on Oct. 22, 2013 in connection with corresponding Japanese Patent Application No. 2010-070128.

Office Action issued by the U.S. Patent and Trademark Office on Oct. 15, 2014, in connection with U.S. Appl. No. 13/512,563.

* cited by examiner

VA-MODE LIQUID-CRYSTAL DISPLAY DEVICE

CROSS-REFERENCE TO RELATED APPLICATIONS

The present invention is a 35 U.S.C. 371 National Stage Entry of PCT/JP2010/071760, filed Nov. 29, 2010, which claims priority from Japanese Patent Application No. 2009-272888, filed on Nov. 30, 2009, the contents of all of which are herein incorporated by reference in their entirety.

TECHNICAL FIELD

The present invention relates to a VA (vertically aligned)-mode liquid-crystal display device improved in the front contrast ratio.

BACKGROUND ART

These days elevation of the contrast ratio (CR) in liquid-crystal display devices is being promoted. In particular, a VA-mode liquid-crystal display device has the advantage that CR in the normal direction (hereinafter referred to as "front CR", and "front CR" may be generally called also as "on-axis contrast ratio") is high as compared with that in other modes, and various studies and developments are now made for further enhancing the advantage. As a result, in these 6 years, the front CR in VA-mode liquid-crystal display devices has increased from about 400 to about 8000, or by about 20 times.

For example, as one means of increasing transmittance, there is known a color filter-on-array (COA) structure (for example, JP-A 2005-99499, 2005-258004, 2005-3733). The COA structure may have an increased aperture ratio and therefore may increase the transmittance in the black or white state of display. At present, the interest in environmental problems is increasing, and employing the COA structure to increase the transmittance contributes toward reduction in power consumption and is favorable from the viewpoint of the environment.

The front CR is determined by two transmittance factors in the while state of display and in the black state of display (white brightness and black brightness), and therefore could not be elevated by mere increase in the transmittance. Even though the transmittance in the white state of display could be increased but when the transmittance in the black state of display is also increased simultaneously, then CR elevation could not be achieved. In order to increase the front CR by employing a structure capable of improving the transmittance in the white state of display, it is important to prevent the increase in the transmittance in the black state of display by the employment of the structure.

On the other hand, in liquid-crystal display devices, it is important that not only the front CR is high but also CR in oblique directions (hereinafter this may be referred to as "viewing angle CR") is high. Various techniques of using one or more retardation films have been proposed for reducing the light leakage in oblique directions in the black state of display in VA-mode liquid-crystal display devices (for example, JP-A 2006-184640). In general, a retardation film is disposed on both the front side and the rear side of the liquid-crystal cell existing in the center therebetween, in which retardation necessary for optical compensation in the display device is distributed into the two retardation films. In general, two systems are employed for the combination for optical compensation. In one system, the retardation films each separately disposed on the front side and on the rear side equally have same retardation; and the advantage of the system is that the films of the same type can be used therein. In the other system, the retardation film disposed on either one side is made to have larger retardation; and the system is advantageous in point of the cost since it enables optical compensation by the use of a combination of inexpensive retardation films. In the latter system, in general, the retardation film to be disposed on the rear side is made to have larger retardation in practical use. One reason is the production cost. Regarding this reason, JP-A 2006-241293, paragraph [0265] says as follows: "In case where the cellulose acylate film of the invention is used only as the protective film, disposed between the liquid-crystal cell and the polarizing film, of one polarizing plate, this may be on either side of the upper polarizing plate (viewers' side) or the lower polarizing plate (backlight side) with no functional problem. However, when it is used on the side of the upper polarizing plate, the functional film must be provided on the viewers' side (upper side) and the producibility may be thereby lowered, and therefore, it may be used on the side of the lower polarizing plate in many cases, and this may be a more preferred embodiment." The second reason is that disposing the film having larger retardation on the rear side is preferred from the viewpoint of the impact resistance and the resistance to environmental change including temperature change and humidity change.

SUMMARY OF INVENTION

The present inventor tried employing a COA structure in a VA-mode liquid-crystal display device to improve the front CR, but has found that the front CR could not be improved. Further investigations have revealed that one reason is the presence in a VA-mode liquid-crystal display film of a retardation film that contributes toward reducing the light leakage in oblique directions in the black state of display, or that is, toward improving the viewing angle CR of the display. In particular, it has been known that, in the above-mentioned VA-mode liquid-crystal display device having an ordinary constitution, in which a retardation film having large retardation is disposed on the rear side, when a COA structure is employed, the front CR could not be improved but is rather lowered. As far as the present inventor knows, it may be said that nothing has heretofore been known relating to the problem of employing a COA structure in a VA-mode liquid-crystal display device having a retardation film.

Specifically, one object of the present invention is to solve the problem of employing a COA structure in a VA-mode liquid-crystal display device having a retardation film, which, however, has not heretofore been known in the art. Concretely, an object of the invention is to provide a COA-structured VA-mode liquid-crystal display device improved in the front contrast ratio.

As described in the above, the present inventor's investigations have revealed that employing a COA structure results in enlarging the aperture ratio to thereby increase the transmittance in the white state of display, but on the other hand, it also results in increasing the light leakage in the black state of display. In particular, it has been known that, in case where a COA structure is employed in a VA-mode liquid-crystal display device where a retardation film having a large retardation is disposed on the rear side, the front CR could not be improved but the front CR is rather lowered as compared with the display device not having a COA structure. The present inventor has assiduously studied for the purpose of solving this problem and, as a result, has found that Rth of the retardation film disposed on the rear side has some influence on the reduction in the front CR and that not only Rth of the retardation film disposed outside the rear-side substrate of the liquid-crystal cell but also Rth of the color filter layer formed on the rear-side substrate has some influence thereon. On the basis of these findings, the inventor has further investigated and, as a result, has found that when the total Rth of these members falls within a predetermined range, then the front CR of the COA structure-having VA-mode liquid-crystal display device can be remarkably improved, and then made the present invention.

The means for achieving the above object are as follows.

[1] A VA-mode liquid-crystal display device comprising:
a front-side polarizing element,
a rear-side polarizing element,
a liquid-crystal layer disposed between the front-side polarizing element and the rear-side polarizing element,
a color filter layer disposed between the liquid-crystal layer and the rear-side polarizing element, and
a rear-side retardation region composed of one or more retardation layers disposed between the rear-side polarizing element and the color filter layer;
wherein the total of retardation along the thickness-direction at a wavelength of 550 nm of the color filter layer, $Rth_{CF}(550)$, and retardation along the thickness-direction at a wavelength of 550 nm of the whole rear-side retardation region, $Rth_{rear}(550)$, satisfies following formula (I):

$$|Rth_{CF}(550)+Rth_{rear}(550)| \leq 90 \text{ nm}. \tag{I}$$

[2] The VA-mode liquid-crystal display device of [1], wherein the liquid-crystal layer is sandwiched between an array substrate provided with the color filter layer and having a black matrix to partition pixels, and a counter substrate disposed to face the array substrate.

[3] The VA-mode liquid-crystal display device of [1] or [2], wherein the rear-side retardation region satisfies following formula (II):

$$|Re(550)| \leq 20 \text{ nm}, \tag{II}$$

wherein $Re(\lambda)$ means retardation (nm) in-plane at a wavelength of $\lambda$ nm of the region.

[4] The VA-mode liquid-crystal display device of any one of [1]-[3]i, wherein one or more retardation layers disposed between the front-side polarizing element and the liquid-crystal layer (hereinafter the whole of one or more layers disposed between the front-side polarizing element and the liquid-crystal layer is referred to as "front-side retardation region") satisfy, as a whole, following formulae (III) and (IV):

$$30 \text{ nm} \leq Re(550) \leq 90 \text{ nm}, \tag{III}$$

$$150 \text{ nm} \leq Rth(550) \leq 300 \text{ nm}. \tag{IV}$$

[5] The VA-mode liquid-crystal display device of any one [1]-[4], wherein the rear-side retardation region satisfies following formula (Ia):

$$|Rth(550)| \leq 20 \text{ nm}. \tag{Ia}$$

[6] The VA-mode liquid-crystal display device of [5], wherein the front-side retardation region satisfies the following formulae (IIIa) and (IVa):

$$30 \text{ nm} \leq Re(550) \leq 90 \text{ nm}, \tag{IIIa}$$

$$180 \text{ nm} \leq Rth(550) \leq 300 \text{ nm}. \tag{IVa}$$

[7] The VA-mode liquid-crystal display device of any one of [1]-[4], wherein the rear-side retardation region satisfies following formula (Ib):

$$20 \text{ nm} < |Rth(550)| \leq 90 \text{ nm}. \tag{Ib}$$

[8] The VA-mode liquid-crystal display device of [7], wherein the front-side retardation region satisfies following formulae (IIIb) and (IVb):

$$30 \text{ nm} \leq Re(550) \leq 90 \text{ nm}, \tag{IIIb}$$

$$150 \text{ nm} \leq Rth(550) \leq 270 \text{ nm}. \tag{IVb}$$

[9] The VA-mode liquid-crystal display device of any one of [1]-[8], wherein the rear-side retardation region satisfies the following two formulae:

$$|Rth(450)|/|Rth(550)| \leq 1, \text{ and}$$

$$1 \leq Rth(630)|/|Rth(550)|.$$

[10] The VA-mode liquid-crystal display device of any one of [1]-[9], wherein the color filter layer is disposed inside the liquid-crystal cell and Rth of the color filter layer satisfies the following two formulae:

$$|Rth(450)|/|Rth(550)| \leq 1, \text{ and}$$

$$1 \leq |Rth(630)|/|Rth(550)|.$$

[11] The VA-mode liquid-crystal display device of any one of [1]-[10], wherein the rear-side retardation region is formed of a cellulose acylate-base film or comprises a cellulose acylate-base film.

[12] The VA-mode liquid-crystal display device of any one of [1]-[11], wherein the rear-side retardation region is formed of an acryl-base polymer film or comprises an acryl-base polymer film.

[13] The VA-mode liquid-crystal display device of [12], wherein the rear-side retardation region is formed of an acryl-base polymer film containing an acryl-base polymer containing at least one unit selected from lactone ring units, maleic anhydride units and glutaric anhydride units, or contains the acryl-base polymer film.

[14] The VA-mode liquid-crystal display device of any one of [1]-[13], wherein the rear-side retardation region is formed of a cyclic olefin-base polymer film or contains a cyclic olefin-base polymer film.

[15] The VA-mode liquid-crystal display device of any one of [1]-[14], wherein the front-side retardation region is formed of one biaxial polymer film or contains one biaxial polymer film.

[16] The VA-mode liquid-crystal display device of any one of [1]-[15], wherein the front-side retardation region contains one monoaxial polymer film.

[17] The VA-mode liquid-crystal display device of [15] or [16], wherein one biaxial polymer film or one monoaxial polymer film is a cellulose acylate-base film.

[18] The VA-mode liquid-crystal display device of [15] or [16], wherein one biaxial polymer film or one monoaxial polymer film is a cyclic olefin-base polymer film.

Figure 1:
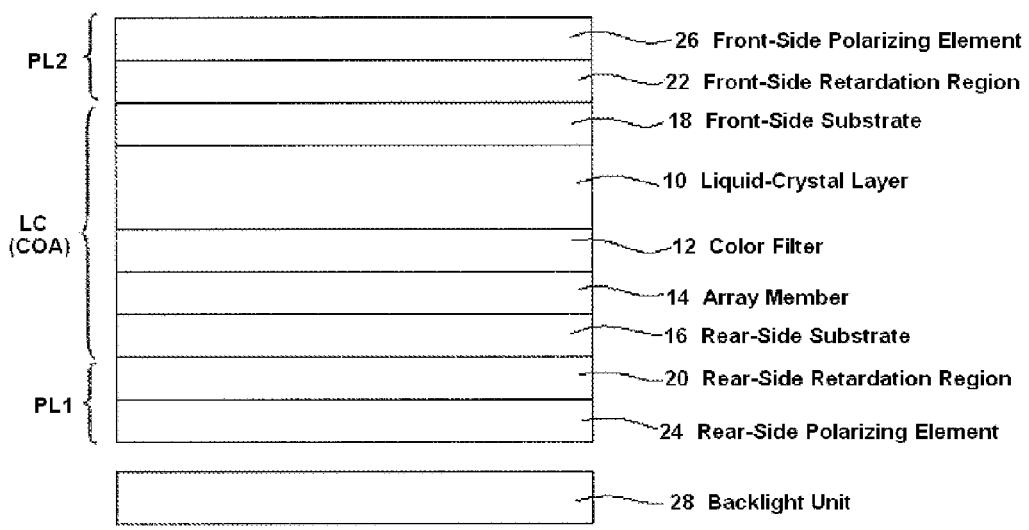
FIG. 1 is a schematic cross-sectional view of one example of the VA-mode liquid-crystal display device of the invention.

In the drawings, the reference numerals have the following meanings.

10 Liquid-Crystal Layer
12 Color Filter Layer
14 Array Member
16 Rear-Side Substrate
18 Front-Side Substrate 20 Rear-Side Retardation Region
22 Front-Side Retardation Region
24 Rear-Size Polarizing Element
26 Front-Side Polarizing Element
28 Backlight Unit
LC COA-Structured VA-Mode Liquid-Crystal Cell
PL1 Rear-Side Polarizing Plate
PL2 Front-Side Polarizing Plate

MODE FOR CARRYING OUT THE INVENTION

The invention is described in detail hereunder. Note that, in this patent specification, any numerical expressions in a style of " . . . to . . . " will be used to indicate a range including the lower and upper limits represented by the numerals given before and after "to", respectively.

At first, the terms used in the description will be explained. (Retardation, Re and Rth)

In this description, $Re(\lambda)$ and $Rth(\lambda)$ are retardation in plane (nm) and retardation along the thickness direction (nm), respectively, at a wavelength of $\lambda$. $Re(\lambda)$ is measured by applying light having a wavelength of $\lambda$ nm to a sample such as a film in the normal direction thereof, using KOBRA 21ADH or WR (by Oji Scientific Instruments). The standard wavelength of KOBRA is 590 nm.

When a sample to be analyze by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the $Rth(\lambda)$ of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulae (X) and (XI):

$$Re(\theta) = \left[ nz - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (X)$$

$$Rth = \left(\frac{nx+ny}{2} - nz\right) \times d \quad (XI)$$

wherein $Re(f)$ represents a retardation value in the direction tilted by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of $\lambda$ nm applied in the tilted direction; and based on the thus-measured retardation values, the estimated value of the mean refractive index and the inputted film thickness value, $Rth(\lambda)$ of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In this description, the values of $Re(\lambda)$ and $Rth(\lambda)$ such as Re(450), Re(550), Re(630), Rth(450), Rth(550) and Rth (630) are computed from the data of Re and Rth measured with a measuring device at three or more different wavelengths (e.g., $\lambda$=479.2, 546.3, 632.8 or 745.3 nm). Concretely, the measured values are approximated by the Cauchy's formula (up to the 3rd term, $Re=A+B/\lambda^2+C/\lambda^4$) to determine the values A, B and C. In that manner, the data of Re and Rth at a wavelength of $\lambda$ are replotted, from which $Re(\lambda)$ and $Rth(\lambda)$ at the wavelength $\lambda$ may be thereby determined.

In this description, the "slow axis" of the retardation film and others means the direction in which the refractive index is the largest. The "visible light region" is from 380 nm to 780 nm. Unless otherwise specifically indicated in this description, the measurement wavelength is 550 nm. In the technical field to which the invention belongs, the wavelength of 550 nm is used for regulating the properties of films.

In this description, it should be so interpreted that the numerical data, the numerical range and the qualitative expression (for example, expression of "equivalent", "equal" or the like) indicating the optical properties of the constitutive members such as the retardation region, the retardation film, the liquid-crystal layer and others shall be the numerical data, the numerical range and the qualitative properties including generally acceptable errors regarding the liquid-crystal display device and the constitutive members thereof.

In this description, a retardation film means a self-supporting film disposed between a liquid-crystal cell and a polarizing element (irrespective of the level of retardation). The retardation film is synonymous with a retardation layer. The retardation region is a generic term for one or more layers of a retardation film disposed between a liquid-crystal cell and a polarizing element.

In this description, "front side" means the display panel side; and "rear side" means the backlight side. The subscripts "front", "rear" and "CF" added to "Re" or "Rth" indicate Re or Rth of a front-side retardation region, a rear-side retardation region and a color filter respectively.

In this description, the "front side" means the panel side; and the "rear side" means the backlight side. In this description, the "front" means the normal direction to the panel face; and the "front contrast ratio (CR)" means the contrast ratio computed from the white brightness and the black brightness measured in the normal direction to the panel face; and the "viewing angle contrast ratio (CR)" means the contrast ratio computed from the white brightness and the black brightness measured in the oblique directions inclined from the normal direction relative the panel face (for example, in the direction defined at an azimuth direction of 45 degrees and a polar angle direction of 60 degrees relative to the panel face).

The invention relates to a COA structure-having VA-mode liquid-crystal display device. FIG. 1 is a schematic cross-sectional view of one example of the liquid-crystal display device of the invention; and for reference, FIG. 2 shows a schematic cross-sectional view of one example of a non-COA-structured, VA-mode liquid-crystal display device.

The VA-mode liquid-crystal display device of the invention shown in FIG. 1 comprises a front-side polarizing element 26, a rear-side polarizing element 24, a liquid-crystal layer 10 disposed between the front-side polarizing element 26 and the rear-side polarizing element 24, a color filter layer 12 disposed between the liquid-crystal layer 10 and the rear-side polarizing element 24, a rear-side retardation region 20 disposed between the rear-side polarizing element 24 and the color filter layer 12, and a front-side retardation region 22 disposed between the front-side polarizing element 26 and the liquid-crystal layer 10. The liquid-crystal cell LC that the VA-mode liquid-crystal display device of FIG. 1 has is a COA-structured liquid-crystal cell, in which the liquid-crystal layer 10 is sandwiched between the front-side substrate 18 and the rear-side substrate 16, and the array member 14 and the color filter 12 are disposed on one and the same substrate, the rear-side substrate 16. The liquid-crystal cell LC may have a black matrix (not shown), and its position may be on the rear-side substrate 16 or on the front-side substrate 18.

Figure 2:
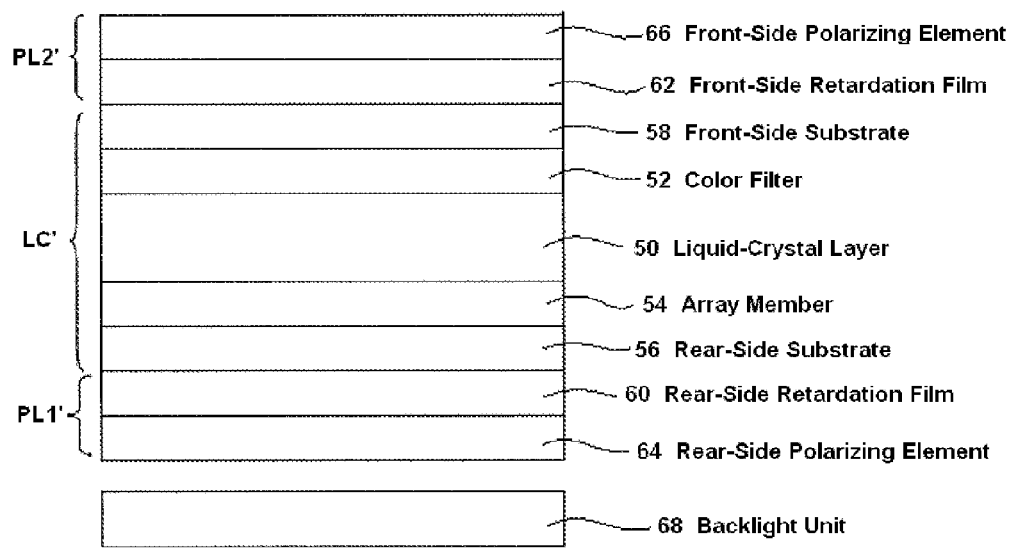
FIG. 2 is a schematic cross-sectional view of one example of a non-COA-structured, VA-mode liquid-crystal display device given herein for reference.

FIG. 2 is a reference example, showing a schematic cross-sectional view of one example of a VA-mode liquid-crystal display device having a non-COA-structured liquid-crystal cell LC'. In FIG. 2, the liquid-crystal cell LC' is a non-COA-structured liquid-crystal cell comprising a liquid-crystal layer 50 and a front-side substrate 58 and a rear-side substrate 56 between which the cell is sandwiched, and in this, a color filter 52 is disposed on a substrate different from the array member 54, or that is, on the front-side substrate 58.

Regarding the VA-mode liquid-crystal display devices of FIG. 1 and FIG. 2, the reason for increasing the transmittance in the front direction in the black state of display, or that is, the reason for augmenting the light leakage is described.

In general, in a VA-mode liquid-crystal display device, the liquid-crystal layer (10 or 50) is in a vertical alignment state in the black state of display, and in this, therefore, the linear polarized light that passes through the rear-side polarizing element (24 or 64) and runs in the normal direction does not change its polarization state even after passing through the liquid-crystal layer (10 or 50), and in principle, the light is completely absorbed at the absorption axis of the front-side polarizing element (26 or 66). In other words, in principle, it may be said that there is no light leakage in the normal direction in the black state of display. However, the front transmittance of the VA-mode liquid-crystal display device is not zero in the black state. It is known that one reason is because the liquid-crystal molecules in the liquid-crystal layer (10 or 50) fluctuate, and the light having come into the liquid-crystal layer is scattered in some degree by the fluctuation. When the light having come into the liquid-crystal layer (10 or 50) contains completely only the linear polarized component to be absorbed at the absorption axis of the front-side polarizing element (26 or 66), the influence may be greater and the light leakage on the front tends to increase. Specifically, when retardation in the retardation region (20 or 60) disposed on the rear side is larger and when the incident light is elliptically polarized at a higher elliptical polarization degree, then the light leakage on the front owing to the fluctuation can be reduced more.

However, as described above, the present inventor's investigation have revealed that, except the fluctuation of the liquid-crystal molecules in the liquid-crystal layer, retardation in the retardation region (20 or 60) between the rear-side polarizing element (24 or 64) and the liquid-crystal layer (10 or 50) also contributes to the reason for light leakage. When the oriented light from the backlight (28 or 68) has passed through the rear-side polarizing element (24 or 64) and comes in the retardation film (20 or 60) in an oblique direction, the linear polarized light is converted into elliptical polarized light owing to retardation. The elliptically-polarized light is diffracted and scattered in the array member (14 or 54) of the liquid-crystal cell and in the color filter layer 12 or 52), and at least a part of the light comes to run in the front direction. The elliptically polarized light includes a linear polarized light component that could not be blocked at the absorption axis of the front-side polarizing element (26 of 66), and therefore, even in the black state of display, there occurs light leakage in the front direction, therefore causing a reason for front CR reduction. The optical phenomena to occur through the array member (TFT array, etc.) and the color filter layer are, for example, because the surface of the array member and the color filter layer is not completely smooth but is roughened in some degree and because the member may contain some scattering factors, etc. The influence of the optical phenomena to occur through the array member and the color filter layer on the light leakage in the front direction is greater than the influence thereon of the fluctuation of the liquid-crystal molecules in the liquid-crystal layer mentioned above.

As a result of further investigations, the present inventor has known that the optical phenomena (diffraction, scattering, etc.) to occur when the light elliptically polarized through the retardation region passes through the predetermined members of the liquid-crystal cell bring about different influence modes on the light leakage in the front direction depending on as to whether the light passes through the member before coming into the liquid-crystal member or the light passes through the member after having passed through the liquid-crystal layer. In any constitution of FIG. 1 and FIG. 2, the incident light passes through the array member (14 or 54) before coming into the liquid-crystal layer (10 or 50). On the other hand, in the COA structure shown in FIG. 1, the incident light passes through the color filter layer (12) before passing through the liquid-crystal layer (10); but in the non-COA structure shown in FIG. 2, the incident light passes through the color filter layer (52) after having passed through the liquid-crystal layer (50).

In case where elliptically polarized light having a smaller degree of elliptical polarization passes through the array member and the color filter layer, the influence of the optical phenomena to occur by the light passing through the member on the light leakage in the front direction could be reduced more.

Accordingly, for reducing the light leakage by the optical phenomena in the array member, elliptically polarized light having a smaller degree of elliptical polarization may be good to enter the member; and in the case of a COA structure, the light leakage owing to the optical phenomena in the color filter layer may also be reduced at the same time.

In the member in which the incident light comes before passing through the liquid-crystal layer, the degree of elliptical polarization of the incident light is determined by retardation of the rear-side retardation region (20 or 60) through which the light passes beforehand. Some color filter layers could express retardation owing to the molecular alignment or molecular packing of the pigment and/or the binder therein to occur in the process of forming the color filter layer; and in the embodiment of FIG. 1 where the color filter layer (12) exhibits Rth, the degree may be determined by retardation of the rear-side retardation region (20 or 60) and retardation of the color filter layer (12). On the other hand, regarding the member through which the incident light passes after having passed through the liquid-crystal layer, retardation of the liquid-crystal layer may also have some influence thereon in addition to the influence thereon of retardation of the rear-side retardation region (20 or 60). In this, when switching between the while state and the black state is taken into consideration in the case of the VA-mode liquid-crystal layer, in general, Δnd(550) of the liquid-crystal layer (where d means the thickness (nm) of the liquid-crystal layer, Δn(λ) means the refractivity anisotropy at a wavelength of λ of the liquid-crystal layer; and Δnd(λ) means the product of Δn(λ) and d) is set to fall between 280 and 350 nm or so. In the case of a non-COA structure, even when retardation of the rear-side retardation region is so planned that the light leakage through the array member could be small, the ellipticity increases by contraries after the incident light has passed through the liquid crystal layer and, as a result, the light leakage owing to the optical phenomena to occur through the member such as the color filter layer may thereby increase. The degree of retardation of the rear-side retardation region (20 or 60), the tendency of the influence of the incident light passing through different members on the front-direction light leakage, and the level of the influence are shown collectively in the following Table.

filter layer (52) tends to increase; when .retardation of the rear-side retardation film (60) is high, then the light leakage in the front direction to be caused by the optical phenomena in the array member (54) tends to increase, while on the other hand, the light leakage in the front direction to be caused by the optical phenomena in the color filter layer (52) could be reduced; or that is, the two actions are in offset relation to each other. Accordingly, in the non-COA structure, the magnitude of .retardation of the rear-side retardation film could have little influence on the front CR; and in the non-COA-structured VA-mode liquid-crystal display device, it is unnecessary to investigate .retardation of the rear-side retardation film in point of the front CR. In other words, even though the rear-side retardation film is made to share a high retardation, the problem of front CR reduction does not occur; and therefore, as so mentioned in the above, in consideration of the production cost, the impact resistance and the environmental resistance, the rear-side retardation film is so planned as to share a high retardation in practical use.

On the other hand, as in the above Table, when .retardation of the rear-side retardation region (20) is lowered in the VA-mode liquid-crystal display device of FIG. 1 having a COA-structured liquid-crystal cell, then the light leakage in the front direction to be caused by the optical phenomena in the array member (14) could be reduced, and further, the light leakage in the front direction to be caused by the optical phenomena in the color filter layer (12) could also be reduced; but on the contrary, when .retardation of the rear-side retardation region (20) is high, then the light leakage in the front direction to be caused by the optical phenomena in the array member (14) tends to increase, and further, the light leakage in the front direction to be caused by the optical phenomena in the color filter layer (12) also tends to increase. Accordingly, even though the COA structure is employed and the aperture ratio is enlarged in the latter constitution, the light leakage in the front direction in the black state of display increases owing to the optical phenomena through the array member and the color filter member, and therefore the front CR could

| COA-Structured Liquid-Crystal Cell in FIG. 1 | Order of Incident Light | Reduction in Retardation of Rear-Side Retardation Region | Increase in Retardation of Rear-Side Retardation Region | Relative Relationship to Influence on Level of Light Leakage |
|---|---|---|---|---|
| Liquid-Crystal Layer | 3 | Act of increasing light leakage | Act of reducing light leakage | weakest |
| Color Filter Layer | 2 | Act of reducing light leakage | Act of increasing light leakage | strong |
| Array Member | 1 | Act of reducing light leakage | Act of increasing light leakage | strongest |
| Non-COA-Structured Liquid-Crystal Cell in FIG. 2 | Order of Incident Light | Reduction in Retardation of Rear-Side Retardation Region | Increase in Retardation of Rear-Side Retardation Region | Relative Relationship to Influence on Level of Light Leakage |
| Color Filter Layer | 3 | Act of increasing light leakage | Act of reducing light leakage | strong |
| Liquid-Crystal Layer | 2 | Act of increasing light leakage | Act of reducing light leakage | weakest |
| Array Member | 1 | Act of reducing light leakage | Act of increasing light leakage | strongest |

As shown in the above Table, in the VA-mode liquid-crystal display device having a non-COA-structured liquid-crystal cell, when retardation of the rear-side retardation film (60) is low, then the light leakage in the front direction to be caused by the optical phenomena in the array member (54) could be reduced, while on the other hand, the light leakage in the front direction to be caused by the optical phenomena in the color not be improved but the front CR rather lowers. So far as the present inventor knows, the problem is heretofore unknown in the art.

The influence of .retardation in the rear-side retardation region on the front CR is almost negligible in liquid-crystal display devices having a low front CR. However, in liquid-crystal display devices having a high front CR (for example, having a front CR of at least 1500) provided these days, the influence is not negligible for the purpose of further elevating the front CR. The invention is especially effective for further elevating the front CR of liquid-crystal display devices having a front CR of at least 1500.

As so mentioned in the above, the front CR improving effect of the invention is not an effect to be attained by employing the COA-structured liquid-crystal cell to increase the aperture ratio, but can be attained by reducing the overall Rth of the rear-side retardation region and the color filter layer through which the incident light passes before passing through the liquid-crystal layer, thereby to reduce the scattering of the polarized light coming in the liquid-crystal cell, whereby, as a result, the front black brightness is lowered. On the assumption that the polarized light running into a liquid-crystal cell could maintain its polarization state even after scattered by the inner members, the effect of the invention could be described based on the trajectory of the polarized light on a Poincare sphere. On the other hand, heretofore, it is not considered that, when a polarized light is scattered, the light could keep the polarization state thereof; and therefore, the fact that the effect of the invention that has solved the problem of front CR reduction owing to light scattering inside a liquid-crystal cell could be described by the trajectory of a polarized light on a Poincare sphere could not be expected.

Not only the front CR but also the front color tone in the black state of display (front blackness) is an important display characteristic of a liquid-crystal display device. The present inventor's investigations have revealed that, when .retardation (Re and Rth) of the rear-side retardation region and/or the color filter layer of a COA-structured liquid-crystal cell has reversed wavelength dispersion characteristics of such that .retardation is larger at a longer wavelength in a visible light region, then the color shift of the front blackness to a specific color can be reduced. The reason may be the same as that for the light leakage in the front direction in the liquid-crystal display device mentioned in the above. Specifically, when the reversed wavelength dispersion characteristics of .retardation of the rear-side retardation region and/or the color filter layer are stronger, then the wavelength dependency of the elliptic polarization of the light running obliquely into the liquid-crystal display device from the light source (backlight) could be reduced with the result that the wavelength-dependent light leakage level could be thereby reduced and the color shift to a specific color of the front blackness could also be reduced.

The present inventor has further investigated and has found that, in a device with a COA-structured liquid-crystal cell, the color shift on the front in the black state of display can be reduced more, as compared with that in a device with a non-COA-structured liquid-crystal cell. The reason is because, in the device with a non-COA-structured liquid-crystal cell, the scattering on the member on the front-side substrate, on which the influence of .retardation of the liquid-crystal layer is great, must be taken into consideration. The incident light to run into the non-COA-structured liquid-crystal cell passes through the liquid-crystal layer before being scattered on the member on the front-side substrate. Retardation of the liquid-crystal layer, or that is, $\Delta nd(\lambda)$ has regular wavelength dispersion characteristics (meaning that .retardation is smaller at a longer wavelength), and therefore, when the incident light passes through the liquid-crystal layer, the elliptical polarizability of the light in a short wavelength region becomes higher and, as a result, the light in a blue region tends to leak more. When the thickness of the liquid-crystal layer for every pixel is changed (multi-gap), then the wavelength dispersion characteristics of $\Delta nd(\lambda)$ of the liquid-crystal layer may be thereby changed; however, in case where the value of $\Delta nd(\lambda)/\lambda$ is smaller at a longer wavelength, the light in a blue region tends to leak more as described in the above. Accordingly, the COA-structured liquid-crystal cell that is influenced little by the scattering on the member on the front-side substrate can reduce the front color shift in the black state of display, as compared with the non-COA-structured liquid-crystal cell.

In case where the rear-side retardation region and the color filter of the COA-structured liquid-crystal cell are made to have a reduced Rth as a whole and have reversed wavelength dispersion characteristics of retardation, the front CR can be improved and the front color shift in the black state of display can be reduced.

More concretely, in case where the rear-side retardation region and the color filter of the COA-structured liquid-crystal cell are made to have a reduced Rth as a whole and have reversed wavelength dispersion characteristics of retardation, the front color shift in the black state of display can be reduced more, as compared with that in the other embodiment where the rear-side retardation region and the color filter also have a reduced Rth as a whole but has regular wavelength dispersion characteristics of retardation. In the latter embodiment, somewhat bluish color shift is observed, but in the former embodiment, bluish color shift is seen little. On an u' v' chromaticity diagram, black must have v' of at least 0.375, but on the u' v' chromaticity diagram, bluish color shift in the black state of display means reduction in the value v'. In the former embodiment, v' can reach 0.38 or more.

Reducing the total Rth of the rear-side retardation and the color filter of the COA-structured liquid-crystal cell contributes toward improving not only the front-direction CR but also the contrast ratio in oblique directions (hereinafter this may be referred to as "viewing angle CR"). For example, even though the COA-structured liquid-crystal cell is employed but when the rear-side retardation region and/or the color filter layer have a high retardation as in existing technology, neither the front CR nor the viewing angle CR could be improved. Specifically, the viewing angle CR improving effect of the invention is an effect attained by reducing the light leakage that fluctuates depending on the incident light polarization into the liquid-crystal cell, and is an effect that could not be attained merely by employing the COA-structured liquid-crystal cell and increasing the aperture ratio.

This effect is differentiated from the viewing angle CR improving effect of the front-side retardation region to be mentioned below, which is to prevent the polarization axes of a pair of polarizing plates from being shifted from perpendicular configuration.

Like the front CR improving effect thereof, the viewing angle CR improving effect of the invention can be described based on the trajectory of the polarized light on a Poincare sphere, on the assumption that the polarized light running into a liquid-crystal cell could maintain its polarization state even after scattered by the inner members. On the other hand, as mentioned in the above, heretofore it is not considered that, when a polarized light is scattered, the light could keep the polarization state thereof; and therefore, the fact that the effect of the invention that has solved the problem of front CR reduction owing to light scattering inside a liquid-crystal cell could be described by the trajectory of a polarized light on a Poincare sphere could not be expected.

Assiduous investigations made by the present inventor has revealed that, when $Rth_{rear}(550)$ of the whole rear-side retardation region (20 in FIG. 1) through which the incident light passes before coming in the COA-structured liquid-crystal layer, and $Rth_{CF}(550)$ of the color filter layer satisfy the following formula (I):

$$|Rth_{CF}(550)+Rth_{rear}(550)| \le 90 \text{ nm}, \quad (I)$$

surprisingly the above-mentioned problems can be solved. So far as the total of .retardation of the entire retardation region through which the incident light passes before coming in the COA-structured liquid-crystal cell LC, and .retardation of the color filter disposed on the rear-side substrate satisfies the above-mentioned formula (I), and even though the incident light from an oblique direction is thereafter scattered or diffracted in the array member 14 and the color filter layer 12 in the liquid-crystal cell to be the light running in the normal direction and is influenced by the fluctuation of the liquid-crystal molecules in the liquid-crystal layer, the light leakage in the front direction in the black state of display is not excessively increased; and as compared with a VA-mode liquid-crystal display device comprising a non-COA-structured liquid-crystal cell, the front CR of the device of the type can be remarkably improved. The effect of the invention is an effect that could not be attained merely by employing a COA structure and by enlarging the aperture ratio, but is an effect that could be attained only when the COA structure is employed and when the above-mentioned formula (I) is satisfied.

Like to the color filter layer and the array member mentioned above, the same shall apply to the other members not shown in FIG. 1 (for example, black matrix). Specifically, the member through which the incident light passes before passing through the liquid-crystal layer is the same as the array member of the non-COA structure in the above Table; and the member through which the light passes after having passed through the liquid-crystal layer is the same as the color filter of the non-COA structure in the above Table.

As described in the above, the incident light polarization state dependence of the light leakage in the black state of display owing to the optical phenomena at color filter, black matrix and array member every shows the same tendency; however, since the black matrix's contribution is relatively small, the position of the black matrix in the COA-structured liquid-crystal display device may be in any site inside the liquid-crystal cell, but is preferably between the rear-side polarizing element and the liquid-crystal layer for attaining high front CR.

The rear-side retardation region 20 in FIG. 1 may have a single layer structure or may be a laminate of two or more layers. In the embodiment where the region has a single layer structure, the layer must satisfy the formula (I) along with $Rth_{CF}$ of the color filter layer; and in the embodiment where the region is a laminate of at least two layers, the laminate must satisfy the above formula (I) as a whole along with $Rth_{CF}$ of the color filter layer.

For attaining a higher front CR, the haze of the film to be disposed as the rear-side retardation region 20 in FIG. 1 is preferably at most 0.5, more preferably at most 0.3, even more preferably at most 0.2. In this description, the method for measuring the film haze is as follows: A film sample 40 mm×80 mm is prepared, and tested with a haze meter (NDH-2000, by Nippon Denshoku Kogyo) in an environment at 25° C. and 60% RH according to JIS K-6714.

The front side retardation region 22 in FIG. 1 may also be a single layer structure or a laminate composed of two or more layers. Preferably, the front-side retardation region 22 has a retardation capable of contributing toward improving the viewing angle CR for favorably attaining the effect of the invention of not only improving the front CR but also improving the viewing angel CR. As described in the above, $\Delta nd(\lambda)$ of the liquid-crystal layer of the liquid-crystal cell LC is generally from 280 to 350 nm or so; but the preferred range of .retardation, especially Rth of the front-side retardation region 22 varies depending on .retardation of the rear-side retardation region 20 and the value of $\Delta nd(\lambda)$ of the liquid-crystal layer. For improving oblique CR, preferred combinations of the front-side retardation region and the rear-side retardation region relative to $\Delta nd(\lambda)$ of the liquid-crystal layer are described in various patent publications, for example, Japanese Patents 3282986, 3666666 and 3556159, which may be incorporated herein by reference. From this viewpoint, preferably, the front-side retardation region 22 satisfies the following formulae (III) and (IV):

$$30 \text{ nm} \le Re(550) \le 90 \text{ nm}, \quad (III)$$

$$150 \text{ nm} \le Rth(550) \le 300 \text{ nm}. \quad (IV)$$

For satisfying the above-mentioned characteristics, the front-side retardation region 22 may be formed of one or more biaxial polymer films, or may comprise one or more biaxial polymer films. Further, the front-side retardation region 22 may comprise one or more monoaxial polymer films.

$\Delta nd(550)$ of a VA-mode liquid-crystal cell is generally from 280 to 350 nm or so, and this is for increasing as much as possible the transmittance in the white state of display. On the other hand, when $\Delta nd(550)$ is less than 280 nm, the white brightness may decrease slightly along with the reduction in $\Delta nd(550)$, but since the cell thickness d is small, the liquid-crystal display device can be excellent in rapid responsibility. In case where the rear-side first retardation region has a low retardation, then the light leakage in the front direction is reduced and, as a result, the characteristic feature of the invention of attaining a high front CR is effective in any liquid-crystal display devices having different $\Delta nd(550)$.

In one embodiment of the invention, the rear-side retardation region (20 in FIG. 1) satisfies the following formula (II):

$$|Re(550)| \le 20 \text{ nm}. \quad (II)$$

Even when a retardation film having a high Re is disposed on the rear side, the effect of the invention is attained so far as Rth satisfies the above-mentioned formula (I). On the other hand, in case where a retardation film having Re in some degree is disposed on the rear side, strict axial alignment would be necessary in relation to the optical axis of other members such as the absorption axis of the rear-side polarizing element, etc. Preferably, the rear-side retardation region has a low Re and satisfies the above-mentioned formula (II) as a whole, as facilitating axial alignment in incorporating one or more retardation films to be the rear-side retardation region in the liquid-crystal display device.

Another advantage of the invention is reduction in "circular unevenness". "Circular unevenness" is a phenomenon of circular light leakage to occur in a liquid-crystal panel in the black state of display after exposed to a high-temperature/high-humidity atmosphere. Its detail is described in JP-A 2007-187841. One reason is because the backlight-side liquid-crystal cell substrate (that is, rear-side substrate 16 in FIG. 1) is warped when exposed to a high-temperature/high-humidity atmosphere. In the COA structure, a color filter is also disposed in addition to the array member on the rear-side substrate, and the substrate is therefore hardly warped even under heat, and as a result, circular unevenness can be reduced.

One embodiment of the invention is a VA-mode liquid-crystal display device where the rear-side retardation region (20 in FIG. 1) satisfies the formula (Ia):

$$|Rth(550)| \leq 20 \text{ nm.} \tag{Ia}$$

As described in the above, the COA structure employed in the invention can reduce circular unevenness in some degree. The present inventor's investigations have revealed that the circular unevenness is influenced by the optical properties of the rear-side retardation region, and can be reduced more when Rth of the rear-side retardation region is smaller. This embodiment where the rear-side retardation region satisfies the above formula (Ia) enjoys the additional effect of reducing more the circular unevenness in addition to the above-mentioned effect of the invention.

From the viewpoint of circular unevenness, the thickness of the retardation film disposed on the rear-side retardation region (20 in FIG. 1) is preferably smaller; and concretely, the thickness is preferably from 2 to 100 μm or so, more preferably from 2 to 60 μm or so, even more preferably from 2 to 40 μm or so.

As described in the above, when Δnd(550) of the VA-mode liquid-crystal cell is from 280 to 350 nm or so, the transmittance in the white state of display can be high. In this embodiment where the rear-side retardation region satisfies the above-mentioned formula (Ia), the front-side retardation region preferably satisfies the following formulae (IIIa) and (IVa), for improving the viewing angle CR, $$30 \text{ nm} \leq Re(550) \leq 90 \text{ nm,} \tag{IIIa}$$

$$180 \text{ nm} \leq Rth(550) \leq 300 \text{ nm;} \tag{IVa}$$

more preferably, in case where Δnd(550) of the VA-mode liquid-crystal cell is from 280 to 350 nm or so, it satisfies the following formulae (IIIa-1) and (IVa-1), $$50 \text{ nm} \leq Re(550) \leq 75 \text{ nm} \tag{IIIa-1}$$

$$200 \text{ nm} \leq Rth(550) \leq 300 \text{ nm;} \tag{IVa-1}$$

even more preferably, the following formulae (IIIa-2) and (Iva-2), $$50 \text{ nm} \leq Re(550) \leq 75 \text{ nm} \tag{IIIa-2}$$

$$220 \text{ nm} \leq Rth(550) \leq 270 \text{ nm.} \tag{IVa-2}$$

In consideration of the production aptitude of the retardation film, the constitution of using a retardation film with Rth(550)≤230 nm may be preferred in practical use, as the case may be. In general, for obtaining a retardation film having a high retardation, stretching at a high draw ratio must be necessary or increasing the amount of the additive for retardation enhancement must be necessary. However, stretching at a high draw ratio may cause film breakage, and increasing the amount of the additive may cause a trouble of additive bleeding from the film.

From this viewpoint, this embodiment where the rear-side retardation region satisfies the above formula (Ia) preferably satisfies the following formulae (IIIa) and (IVa), for improving also the viewing angle CR, $$30 \text{ nm} \leq Re(550) \leq 90 \text{ nm} \tag{IIIa}$$

$$180 \text{ nm} \leq Rth(550) \leq 300 \text{ nm;} \tag{IVa}$$

more preferably, in case where Δnd(550) of the VA-mode liquid-crystal cell is at most 280 nm or so, it satisfies the following formulae (IIIa-3) and (Iva-3), $$50 \text{ nm} \leq Re(550) \leq 80 \text{ nm} \tag{IIIa-3}$$

$$180 \text{ nm} \leq Rth(550) \leq 280 \text{ nm;} \tag{Iva-3}$$

even more preferably, the following formulae (IIIa-4) and (Iva-4), $$50 \text{ nm} \leq Re(550) \leq 80 \text{ nm} \tag{IIIa-3}$$

$$180 \text{ nm} \leq Rth(550) \leq 230 \text{ nm.} \tag{Iva-3}$$

Another embodiment of the invention is a VA-mode liquid-crystal display device where the rear-side retardation region (20 in FIG. 1) satisfies the following formula (Ib):

$$20 \text{ nm} \leq |Rth(550)| \leq 90 \text{ nm.} \tag{Ib}$$

In this embodiment where the rear-side retardation region satisfies the formula (Ib), the rear-side retardation region shares in some degree .retardation necessary for improving the viewing angle CR; and therefore, this embodiment can attain improvement of the viewing angle CR not using a retardation film having an excessively high retardation in the front-side retardation region. This embodiment where the rear-side retardation region satisfies the formula (Ib) has another advantage of improving the viewing angle CR with good production aptitude in addition to enjoying the effect of the invention mentioned above.

In this embodiment where the rear-side retardation region satisfies the formula (Ib), the front-side retardation region preferably satisfies the following formulae (IIIb) and (IVb), for improving also the viewing angle CR, $$30 \text{ nm} \leq Re(550) \leq 90 \text{ nm} \tag{IIIb}$$

$$150 \text{ nm} \leq Rth(550) \leq 270 \text{ nm;} \tag{IVb}$$

more preferably, in case where Δnd(550) of the VA-mode liquid-crystal cell is from 280 to 350 nm or so, it satisfies the following formulae (IIIb-1) and (IVb-1), $$50 \text{ nm} \leq Re(550) \leq 80 \text{ nm} \tag{IIIb-1}$$

$$170 \text{ nm} \leq Rth(550) \leq 270 \text{ nm;} \tag{IVb-1}$$

even more preferably, the following formulae (IIIb-2) and (IVb-2), $$50 \text{ nm} \leq Re(550) \leq 80 \text{ nm} \tag{IIIb-2}$$

$$170 \text{ nm} \leq Rth(550) \leq 230 \text{ nm.} \tag{IVb-2}$$

In case where Δnd(550) of the VA-mode liquid-crystal cell is at most 280 nm, more preferably, the following formulae (IIIb-3) and (IVb-3) are satisfied, $$60 \text{ nm} \leq Re(550) \leq 90 \text{ nm} \tag{IIIb-3}$$

$$150 \text{ nm} \leq Rth(550) \leq 250 \text{ nm;} \tag{IVb-3}$$

even more preferably, the following formulae (IIIb-4) and (IVb-4), $$60 \text{ nm} \leq Re(550) \leq 90 \text{ nm} \tag{IIIb-4}$$

$$150 \text{ nm} \leq Rth(550) \leq 230 \text{ nm.} \tag{IVb-4}$$

Again FIG. 1 is referred to. "COA" in the COA structure that the liquid-crystal cell LC in FIG. 1 has is an abbreviation of color filter-on-array, and a structure where a color filter is formed on an active matrix substrate is called a COA structure. At first, the COA structure is only for forming a color film on an ordinary TFT substrate, but these days in general, in the structure, a pixel electrode is formed on the color film, and via a small hole called a contact hole, the pixel electrode is connected to TFT for improving the display characteristics. The invention is applicable to any of these types. In the COA structure, the thickness of the color filter layer is larger than that of the ordinary-type color filter layer (1 to 2 μm or so), and is generally from 2 to 4 μm or so. This is for the purpose of preventing the parasitic capacity to form between the edge of the pixel electrode and the wiring. The thickness of the color filter layer that the liquid-crystal display device of the invention has is preferably from 2 to 4 μm, to which, however, the invention is not limited. In production of the COA-structured liquid-crystal cell, the pixel electrode on the color filter must be patterned, therefore requiring resistance to etchant and peelant. For this purpose, a color filter material (coloring photosensitive composition) of which the thickness is controlled to be thick is used, but a two-layered constitution of color filter layer formed of an ordinary color filter material+ overcoat layer may be employed. The invention can be applied to any constitution.

The COA structure is described in JP-A 2007-240544, 2004-163979 in addition to the above-mentioned Patent References 1 and 2, and in the invention, any constitution is employable.

The color filter that the liquid-crystal display device of the invention has is a color filter with plural different colors (e.g., three primary colors of light such as red, green and blue, and transparent, yellow, cyan, etc.) aligned in the pixel sites of the substrate, like the color filter that ordinary liquid-crystal display devices have. Various methods for its production are known; and for example, one general method comprises using a coloring material (organic pigment, dye, carbon black, etc.), fabricating a coloring photosensitive composition (may be colorless) called "color resist", applying it onto a substrate to form a layer thereon, and patterning it through photolithography. There are also known various methods for applying the coloring photosensitive composition onto a substrate; and for example, in early times, a spin coater method is employed, and from the viewpoint of saving liquid, a slit and spin coater method is employed; and at present, a slit coater method is generally employed. In addition, there are known a roll coating method, a bar coating method, a die coating method, etc. Recently, also employed is a method of forming a pattern called a partition wall through photolithography followed by forming the color of the pixel according to an inkjet process. In addition, there are known a method comprising a combination of a coloring non-photosensitive composition and a photosensitive positive resist, a printing method, an electrodeposition method, a film transfer method, etc. The color filter for use in the invention may be produced in any method.

The material for color filter formation is not also specifically defined. As the coloring material, usable is any of dye, organic pigment, inorganic pigment, etc. The dye has been investigated from the request for contrast ratio elevation, but recently, the dispersion technology for organic pigment has made advances, and broken-down pigment finely pulverized according to a salt milling method or the like, as well as refined pigment prepared according to a building-up method have become used for contrast ratio elevation. In the invention, any coloring material is employable.

It is presumed that $Rth_{CF}$ of the color filter layer would be expressed in the process of forming the color filter layer, in which the molecules of its materials, binder and pigment, would be aligned or packed. Even though expressed, $Rth_{CF}$ of the color filter layer is extremely small, and would be generally from −45 to 45 nm or so. In case where a retardation enhancer (retardation regulator) is positively added, the filter could express Rth in a range of from −70 to 80 nm or so.

Examples of usable retardation enhancers are the same as those of the Rth enhancers usable for the retardation film to be mentioned hereinunder. In case where Rth of the color filter layer is increased, for example, a compound of the following general formula (X) and a compound similar thereto may be used as the retardation enhancer. In case where Rth of the color filter layer is reduced, for example, a compound of the following general formula (XI) and a compound similar thereto may be used as the retardation reducer. Forming the color filter layer with the above-mentioned retardation enhancer added thereto makes it possible to control $Rth_{CF}$ of the color filter layer.

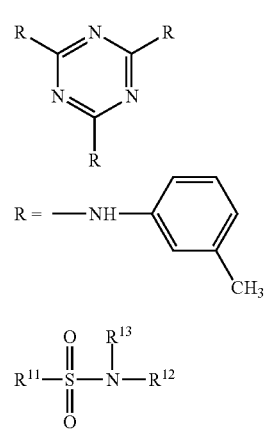

General formula (X)

General formula (XI)

In the above-mentioned general formula (XI), $R^{11}$ represents an alkyl group or an aryl group; $R^{12}$ and $R^{13}$ each independently represent a hydrogen atom, an alkyl group or an aryl group. Especially preferably, the sum total of the carbon atoms of $R^{11}$, $R^{12}$ and $R^{13}$ is at least 10.

As described in the above, $Rth_{CF}$ of the color filter layer preferably satisfies the following two formulae:

$$|Rth_{CF}(450)|/|Rth_{CF}(550)| \le 1, \text{ and}$$

$$1 \le |Rth_{CF}(630)|/|Rth_{CF}(550)|.$$

Specifically, in a visible light region, preferably, $Rth_{CF}$ has reversed wavelength dispersion characteristics, or is constant irrespective of wavelength. More preferably, $Rth_{CF}$ has reversed wavelength dispersion characteristics.

$Rth_{CF}$ of the color filter layer is controllable for every pixel. In case where the liquid-crystal display device has plural color filter layers, $Rth_{CF}$ of the color filter layer having a highest transmittance at a wavelength of 450 nm is $Rth_{CF}$(450); $Rth_{CF}$ of the color filter layer having a highest transmittance at a wavelength of 550 nm is $Rth_{CF}$(550); and $Rth_{CF}$ of the color filter layer having a highest transmittance at a wavelength of 630 nm is $Rth_{CF}$(630).

The wavelength dispersion characteristics of Rth of the color filter layer may be controlled by selecting a raw material, by controlling the production condition and/or by positively adding a wavelength dispersion characteristics regulator.

In FIG. 1, the whole or a part of the rear-side retardation region 20 and the front-side retardation region 22 may function as the protective film for the rear-side polarizing element 24 and that for the front-side polarizing element 26, respectively. Not shown in FIG. 1, the rear-side polarizing element 24 may have, on the surface thereof facing the backlight 28, any functional film such as protective film, antifouling film, antireflection film, antiglare film, antistatic film, etc.; and similarly, the front-side polarizing element may have, on the surface thereof facing the panel side, any functional film such as protective film, antifouling film, antireflection film, antiglare film, antistatic film, etc.

As described in the above, in a system where one side shares a large retardation for optical compensation, heretofore, the film having a large retardation is generally disposed on the rear side; however, it is considered that, in case where the high-retardation film is disposed on the front side, as in the present invention, the yield of polarizing plate may increase. The reason is described below.

The high-retardation film requires a step of stretching it at a high draw ratio, and therefore, its width could hardly be broadened, as compared with inexpensive films not requiring many additives in their production, or that is, so-called plane TAC (triacetyl cellulose film having Re of from 0 to 10 nm and Rth of from 30 to 80 nm), or low-retardation films. In ordinary liquid-crystal display devices, a wide liquid-crystal cell is used, and in general, the absorption axis of the front-side polarizing element is disposed in the horizontal direction (in the width direction) while the absorption axis of the rear-side polarizing element is disposed in the vertical direction (in the length direction). Further, in industrial-scale mass-production, the polarizing element and the retardation film are stuck together generally in a roll-to-roll system. Taking the matter into consideration that the polarizing plate produced according to the method is stuck to the liquid-crystal cell, it is recommended to dispose the high-retardation film on the front side for efficiently using the width direction of the polarizing plate, or that is, the production yield is increased. In case where a low-retardation film is disposed on the rear side as in the present invention, the film can be readily prepared as a wide film, and it can be combined with a wide polarizing element to further increase the production yield. As a result, the amount of the polarizing plate to be wasted may be reduced.

This is described with reference to concrete numerical data. In general, the width of a retardation film is 1100 mm, 1300 mm, 1500 mm, 2000 mm or 2500 mm; and the thickness of the film is about 25 µm, 40 µm or 80 µm. The length of the roll of the film is about 2500 m or 4000 m. On the other hand, regarding the panel size of a VA-mode liquid-crystal display device for application to TV, the panel size may be 20 inches, 32 inches, 40 inches, 42 inches, 52 inches, 68 inches, etc. As one example, 42-inch panels most popularly released at present are discussed here. The 42-inch panel (standard 4:3) has a panel width of 853 mm (42-inch wide panel 16:9 has 930 mm), and a panel height of 640 mm (42-inch wide panel has 523 mm). In a conventional ordinary system where a high-retardation film is disposed on the rear side, only one retardation film for panel could be taken from a retardation film having, for example, a width of 1300 mm or 1500 mm in the width direction thereof. However, in the embodiment of the present invention, a high-retardation film is disposed on the front side, and therefore, even a retardation film having a width of, for example, 1300 mm or 1500 mm could be so cut that the height of the thus-cut film piece corresponding to the height of the panel size could be in the width direction of the film, or that is, retardation films for two panels can be taken in the width direction, and the producibility may be doubled. The TV size is increasing year by year, and for example, a 65-inch (standard) TV has a panel width of 991 mm and a panel height of 1321 mm. In conventional ordinary rear-side disposition in such a wide-view TV, even a wide-sized 2000-mm film could give only one retardation film for one panel in the width direction. Contrary to this, in the front-side disposition as in the embodiment of the present invention, the film can give retardation films for two panels in the width direction. Further, a 68-inch (wide-view) TV has a panel width of 1505 mm and a panel height of 846 mm, for which about doubled producibility can be expected similarly.

The VA-mode liquid-crystal display device of the invention can be driven in any mode, concretely in any mode of MVA (Multi-Domain Vertical Alignment), PVA (Patterned Vertical Alignment), OP (Optical Alignment) or PSA (Polymer-Sustained Alignment). The details of these modes are described in JP-A 2006-215326, and JP-T 2008-538819. The optical alignment mode and the PSA mode realize high front contrast ratio. The advantage of the invention is more remarkable in a high-contrast ratio panel.

In the invention, the front contrast ratio may be further elevated by controlling the angle profile of the incident light from the backlight. Concretely, when a backlight having a higher power of gathering light is used, the absolute value of the front contrast ratio increases, and therefore the increase in the absolute value of the front CR indicated in the invention may be larger. The index of light-gathering power may be represented, for example, by the ratio of the outgoing light intensity on the front $I(0°)$ to the outgoing light intensity at a polar angle of 45 degrees $I(45°)$, $I(0°)/I(45°)$; and a backlight having a larger value of the ratio may be said to have a backlight having a stronger light-gathering power. As the backlight having a high light-gathering power, preferably, a prism film (prism layer) having a light-gathering function is provided between the diffusion film and the liquid-crystal panel. The prism film is to gather the light that has gone out from the light outgoing face of a light guide and has been diffused in a diffusion film, on the effective display area of a liquid-crystal panel at high efficiency. A liquid-crystal display device with an ordinary direct backlight mounted thereon comprises, for example, a color filter sandwiched between a transparent substrate and a polarizing plate and a liquid-crystal panel having a liquid-crystal layer in the upper member thereof, and comprises a backlight below them. One typical example of the device of the type is Brightness Enhancement Film (BEF), a registered trade name by US 3M. BEF is a film on which unit prisms each having a triangular cross section are periodically aligned in one direction, in which the prisms have a larger size (pitch) than the wavelength of light. BEF gathers off-axis light, and redirect or recycle it to on-axis light toward viewers. Many patent references such as JP-B 1-37801, JP-A 6-102506 and JP-T 10-506500 are known, which disclose use of a brightness enhancement member having a recurring array structure of prisms such as typically BEF in displays.

For enhancing the light-gathering capability, use of a lens array sheet is also desirable. The lens array sheet has a lens face in which plural unit convex lenses are aligned two-dimensionally at a predetermined pitch. Preferred is a lens array sheet in which the other side opposite to the lens face is a flat face, and on the flat face, a light reflection layer to reflect the incident light in the non-light-gathering region of the lens is formed. Also preferred is a lens array sheet having a lenticular lens face with plural convex cylindrical lenses are aligned in parallel to each other at a predetermined pitch, and a flat face opposite to the lens face, wherein, on the flat face, a light reflection layer is formed that reflects the stripe-like incident light in the lengthwise direction in the non-light-gathering region of the convex cylindrical lenses. Also usable are, for example, a lenticular lens array sheet having in the face thereof unit lenses each composed of a cylindrical curved face as aligned in one direction, and a lens array sheet having in the face thereof unit lenses each composed of a circular, rectangular or hexagonal bottom and a dome-like curved face as aligned two-dimensionally. These lens array sheets are described in JP-A 10-241434, 2001-201611, 2007-256575, 2006-106197, 2006-208930, 2007-213035 and 2007-41172, of which the contents are incorporated herein by reference.

The present invention is effective also in an embodiment of a display in which the color reproduction region is broadened by controlling the emission spectrum from the backlight and the transmission spectrum through the color filter. Concretely, a white backlight is preferably used, comprising a color mixing combination of a red LED, a green LED and a blue LED. Also preferably, the half-value width of the emission peak from the red LED, the green LED and the blue LED is small. Regarding LED, the half-value wavelength width thereof is 20 nm or so and is small as compared with that of CCFL, and the white purity of the light source itself may be increased by controlling the peak wavelength of R (red) to at least 610 nm, that of G (green) to 530 nm and that of B (blue) to at most 480 nm.

It is reported that, outside the peak wavelength of LED, the spectral transmission of the color filter is controlled to be as small as possible whereby the color reproducibility is further enhanced, and the NTSC ratio is specifically 100%. For example, it is described in JP-A 2004-78102. The red color filter preferably has a low transmission at the peak position of the green LED and the blue LED; the green color filer preferably has a low transmission at the peak position of the blue LED and the red LED; and the blue color filter preferably has a low transmission at the peak position of the red LED and the green LED. Concretely, the transmission is at most 0.1 in every case, more preferably at most 0.03, even more preferably at most 0.01. The relationship between the backlight and the color filter is described, for example, in JP-A 2009-192661, the content of which may be incorporated herein by reference.

Use of a laser light source for the backlight is also preferred for broadening the color reproduction region. Preferably, the peak wavelength of the red, green and blue laser light sources are from 430 to 480 nm, from 520 to 550 nm, and from 620 to 660 nm, respectively. The backlight of laser light sources is described in JP-A 2009-14892, the content of which may be incorporated herein by reference.

Various members which can be used in the VA-mode liquid crystal display device, which is an embodiment of the invention, are described in detail below.

1. Rear-Side and Front-Side Retardation Regions

According to the invention, one or two or more retardation layers as a whole, which are disposed between the rear-side polarizing element and the color filter layer disposed in the VA-mode liquid crystal cell, are called "rear-side retardation region". $Rth_{rear}$ of the rear-side retardation region satisfies the above formula (I) together with $Rth_{CF}$ of the color filter layer. Preferably, $Rth_{rear}$ of the rear-side retardation region satisfies the above formula (II) together with $Rth_{CF}$ of the color filter layer.

In an embodiment, preferably, the rear-side retardation region satisfies the above formula (Ia); and more preferably, it satisfies the following formulas:

$0 \text{ nm} \leq Re(550) \leq 20 \text{ nm}$ and $|Rth(550)| \leq 20 \text{ nm}$;

even more preferably, it satisfies the following formulas:

$0 \text{ nm} \leq Re(550) \leq 10 \text{ nm}$ and $|Rth(550)| \leq 10 \text{ nm}$;

and even much more preferably, it satisfies the following formulas:

$0 \text{ nm} \leq Re(550) \leq 5 \text{ nm}$ and $|Rth(550)| \leq 5 \text{ nm}$.

In another embodiment, the rear-side retardation region satisfies the above formula (Ib), more preferably, it satisfies the following formulas:

$0 \text{ nm} \leq Re(550) \leq 20 \text{ nm}$ and $20 \text{ nm} < |Rth(550)| \leq 90 \text{ nm}$;

even more preferably, it satisfies the following formulas:

$0 \text{ nm} \leq Re(550) \leq 10 \text{ nm}$ and $30 \text{ nm} \leq |Rth(550)| \leq 90 \text{ nm}$:

and even much more preferably, it satisfies the following formulas:

$0 \text{ nm} \leq Re(550) \leq 10 \text{ nm}$ and $40 \text{ nm} \leq |Rth(550)| \leq 80 \text{ nm}$.

According to the invention, one or two or more retardation layers as a whole, which are disposed between the front-side polarizing element and the liquid crystal layer in the liquid crystal cell, are called "front-side retardation region". The front-side retardation region as a whole preferably has retardation contributing to improvement of the viewing angle CR. More specifically, the front-side retardation region preferably satisfies the above formulas (III) and (IV); and in the embodiment wherein the rear-side retardation region satisfies the above formula (Ia), preferably, the front-side retardation region satisfies the above formulas (IIIa) and (IVa). Especially, in the embodiment wherein $\Delta nd(550)$ of the VA-mode liquid crystal cell is from about 280 nm to about 350 nm, more preferably, the front-side retardation region satisfies the above formulas (IIIa-1) and (IVa-1); even more preferably, and it satisfies the above formulas (IIIa-2) and (IVa-2). On the other hand, in the embodiment wherein $\Delta nd(550)$ of the VA-mode liquid crystal cell is equal to or smaller than 280 nm, more preferably, the front-side retardation region satisfies the above formulas (IIIa-3) and (IVa-3); even more preferably, and it satisfies the above formulas (IIIa-4) and (IVa-4). In the embodiment wherein the rear-side retardation region satisfies the above formula (Ib), preferably, the front-side retardation region satisfies the above formulas (IIIb) and (IVb). Especially, in the embodiment wherein $\Delta nd(550)$ of the VA-mode liquid crystal cell is from about 280 nm to about 350 nm, more preferably, the front-side retardation region satisfies the above formulas (IIIb-1) and (IVb-1); even more preferably, and it satisfies the above formulas (IIIb-2) and (IVb-2). On the other hand, in the embodiment wherein $\Delta nd(550)$ of the VA-mode liquid crystal cell is equal to or smaller than 280 nm, more preferably, the front-side retardation region satisfies the above formulas (IIIb-3) and (IVb-3); even more preferably, and it satisfies the above formulas (IIIb-4) and (IVb-4). However, as described above, the invention is not limited to the embodiment employing a VA-mode.

The materials of one or more layers constituting the rear-side or front-side retardation region are not limited. The retardation region satisfying the above formulas (Ia) or (Ib) and the above formula (II), or the retardation region satisfying the above formulas (III) and (IV) can be constituted by one or more biaxial films or by plural uniaxial films such as any combination of C-plate and A-plate; and of course, the retardation region can be also constituted by any combination of one or more biaxial films and one or more uniaxial films. In terms of saving the cost, preferably, at least one of the rear-side and front-side retardation regions is constituted by a single film, and more preferably, both are constituted by a single film respectively.

In any of the above-described embodiments, the wavelength dispersion characteristics of retardation in-plane (Re) of the rear-side and front-side retardation regions preferably becomes larger at a longer wavelength, that is, Re of the rear-side and front-side retardation regions preferably shows the reversed wavelength dispersion characteristics. Namely, Re of the rear-side and front-side retardation regions preferably satisfies Re(450)<Re(550)<Re(630). This is because, using the retardation region in which Re exhibits the reversed wavelength dispersion characteristics, the optical properties may be optimized in all of visible-light wavelength region if the optical properties are optimized at the center wavelength of the visible light, about 550 nm. Most preferably, Re of the retardation region exhibits the reversed-dispersion characteristics, and preferably Re of the retardation region is constant with wavelength variation. As well as Re, Rth of the rear-side retardation region preferably exhibits a higher value at a longer wavelength, that is, the reversed-dispersion characteristics, or is preferably constant with wavelength variation in the visible light wavelength. The reversed-dispersion characteristics are more preferable. That Rth exhibits the reversed-dispersion characteristics or is constant is defined identically as Rth satisfying the following two formulas:

|Rth(450)|/|Rth(550)|≤1 and 1≤|Rth(630)|/|Rth(550)|.

The embodiment, wherein Re of the rear-side retardation region exhibits the characteristics other than normal-dispersion characteristics, that is, Re exhibits the reversed-dispersion characteristics or is constant with wavelength variation, is preferable in terms of reducing the front bluish tone in the black state, compared with the embodiment, wherein Re of the rear-side retardation region exhibits the normal-dispersion characteristics.

The effect caused by Re of the rear-side retardation region exhibiting the reversed-dispersion characteristics is improvement in the front black state (reduction in the front bluish tone in the black state); and, on the other hand, the effect caused by Re of the front-side retardation region exhibiting the reversed-dispersion characteristics is improvement in the viewing angle characteristics such as improvement in viewing angle CR and improvement in the viewing angle color (reduction in the color variation in the oblique direction in the black state). Namely, the embodiment, wherein the rear-side retardation region exhibits low retardation and the reversed-dispersion characteristics and the front-side retardation region satisfies the above formulas (III) and (IV) and exhibits the reversed-dispersion characteristics, may be improved in terms of both of front CR and viewing angle CR, that is, may exhibit the good characteristics in terms of the front and viewing angle black state.

As described above, for obtaining the higher front CR, internal haze of the retardation film(s) constituting the rear-side or front-side retardation region is preferably equal to or smaller than 0.5, more preferably equal to or smaller than 0.3, and even more preferably equal to or smaller than 0.2.

In the description, the term "haze" means internal haze. Usually, "haze" of a film can be an indicator indicating transparency thereof, and may be measured using a haze-meter according to JIS K-6714. The smaller haze a film has, the higher transparency the film has.

The rear-side or front-side retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-base polymer, a polyester-base polymer such as polyethylene terephthalate or polyethylene naphthalate, an acrylic-base polymer such as polymethylmethacrylate, or a styrene-base polymer such as polystyrene or an acrylonitrile-styrene copolymer (AS resin) may be used. Polyolefin such as polyethylene or polypropylene, a polyolefin-base polymer such as an ethylene-propylene copolymer, a vinyl chloride-base polymer, an amide-base polymer such as nylon or aromatic polyamide, an imido-base polymer, a sulfone-base polymer, a polyether sulfone-base polymer, polyetherether ketone-base polymer, a polyphenylensulfide-base polymer, a vinylidene chloride-base polymer, a vinyl alcohol-base polymer, a vinyl butyral-base polymer, an acrylate-base polymer, a polyoxymethylene-base polymer, an epoxy-base polymer, and a polymer containing a mixture of the above polymers, and are used as a major ingredient for preparing the retardation film constituting the rear-side or front-side retardation region satisfying the above-described properties.

As a retardation film satisfying the formulas (Ia) or (Ib) and (II) alone or a lamination of two or more films as a whole or a retardation film satisfying the formulas (III) and (IV) alone or a lamination of two or more films as a whole, cellulose acylate-base, acryl-base polymer, and cycloolefin-base polymer films are preferable.

Cellulose Acylate-Base Film:

In the description, the term "cellulose acylate-base film" means a film containing any cellulose acylate(s) as a major ingredient (50 mass % or more with respect to the total mass of all ingredients). The cellulose acylate(s) which can be used for preparing the film is a compound in which hydrogen atom(s) of hydroxy group in the cellulose acylate is substituted with an acyl group. The cellulose acylate is a compound in which hydrogen atom(s) of hydroxy group in the cellulose acylate is substituted with an acyl group; and the acyl group having from 2 (acetyl) to 22 carbon atoms may be used as the substituent. Regarding the cellulose acylate which can be used in the invention, the substitution degree of hydroxy group in cellulose is especially not limited. The degree of substitution (degree of acylation) can be obtained by measuring the binding degree of acetic acid and/or $C_3$-$C_{22}$ aliphatic acid to hydroxy(s) in cellulose and then calculating the measured values(s). The measuring may be carried out according to ASTM ⓓ D-817-91.

The substitution degree of the cellulose acylate which can be used as a material of the retardation film(s) constituting the retardation region is especially not limited, and is preferably from 2.30 to 3.00. The reversed-dispersion characteristics of the cellulose acylate-base film may be prepared by controlling the substitution degree or using any retardation enhancer, which is described in JP-A 2009-63983 or the like.

The cellulose acylate is preferably cellulose acetate, and may have any acyl group other than acetyl in place of acetyl or together with acetyl. Among these, cellulose acylates having at least one acyl selected from the group consisting of acetyl, propionyl and butyryl is preferable; and cellulose acylates having at least two selected from the group consisting of acetyl, propionyl and butyryl is more preferable. And cellulose acylates having acetyl and propionyl and/or butyryl are even more preferable; and the cellulose acylates having the substitution degree of acetyl of from 1.0 to 2.97 and the substitution degree of propionyl and/or butyryl of from 0.2 to 2.5 are even much more preferable.

The mass-averaged polymerization degree of the cellulose acylate to be used for preparing the retardation film constituting the retardation region is preferably from 200 to 800, and more preferably from 250 to 550. The number-averaged molecular weight of the cellulose acylate to be used for preparing the retardation film constituting the retardation region is preferably from 70000 to 230000, more preferably from 75000 to 230000, and even more preferably from 78000 to 120000.

Examples of the cellulose acylate(s) which can be used for preparing the film satisfying the formula (Ia) include those described in JP-A 2006-184640, [0019]-[0025].

The cellulose acylate-base film to be used as a part of the retardation region or as the retardation region itself is preferably prepared according to a solution casting method. In this method, a solution (dope) which is prepared by dissolving cellulose acylate in an organic solvent is used for forming the film. When at least one additive is used, the additive may be added to a dope in any step during preparing the dope.

In preparing the cellulose acylate-base film for the front-side retardation region, any retardation enhancer is preferably used, and in preparing the cellulose acylate-base film for the rear-side retardation region, any retardation enhancer may be used. Examples of the retardation enhancer which can be used in the invention include rod-like or discotic compounds and positive-birefringence compounds. Examples of the rod-like or discotic compound include compounds having at least two aromatic rings, and are preferably used as a retardation enhancer. An amount of the rod-like compound is preferably from 0.1 to 30 parts by mass, and more preferably from 0.5 to 20 parts by mass with respect to 100 parts by mass of the polymer ingredients including cellulose acylate. An amount of the discotic compound is preferably from 0.05 to 20 parts by mass, more preferably from 0.1 to 15 parts by mass, and much more preferably from 0.1 to 10 parts by mass with respect to 100 parts by mass of the cellulose acylate.

The discotic compound is more excellent than the rod-like compound in terms of enhancing Rth retardation; and when especially high Rth retardation is required, the discotic compound is preferably used. Plural types of the compounds may be used as a retardation enhancer.

The retardation enhancer preferably has a maximum absorption within the wavelength range of from 250 to 400 nm, and preferably has no absorption within the visible-light range substantially.

Examples of the retardation enhancer include compound (1)-(3) as follows.

(1) Discotic Compound

The discotic compound is described in detail. As the discotic compound, compounds having at least two aromatic rings may be used.

In the description, the term "aromatic ring" means not only an aromatic hydrocarbon ring but also an aromatic hetero ring. Examples of the discotic compound which can be used in the invention include those described in JP-A 2008-181105, [0038]-[0046].

Examples of the discotic compound which can be used as a material of the retardation film constituting the retardation region include the compounds represented by formula (I) below.

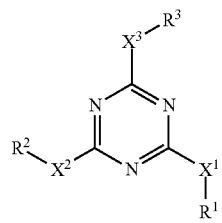

(I)

In the formula, $X^1$ represents a single bond, $-NR^4-$, $-O-$ or $-S-$; $X^2$ represents a single bond, $-NR^5-$, $-O-$ or $-S-$; $X^3$ represents a single bond, $-NR^6-$, $-O-$ or $-S-$. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

Preferred examples, I-(1) to IV-(10), of the compound represented by formula (I) include, but are not limited to, those shown below.

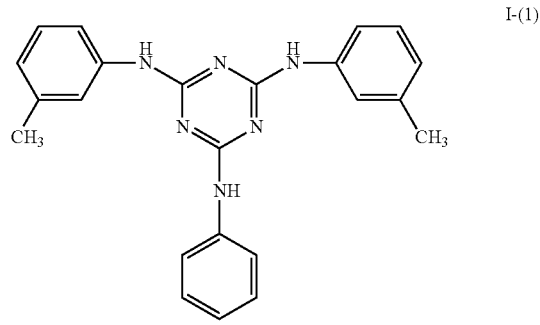
I-(1)

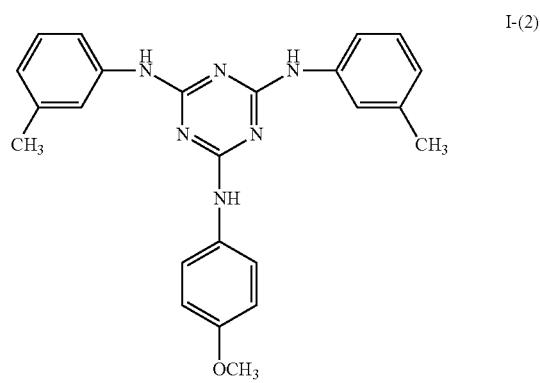
I-(2)

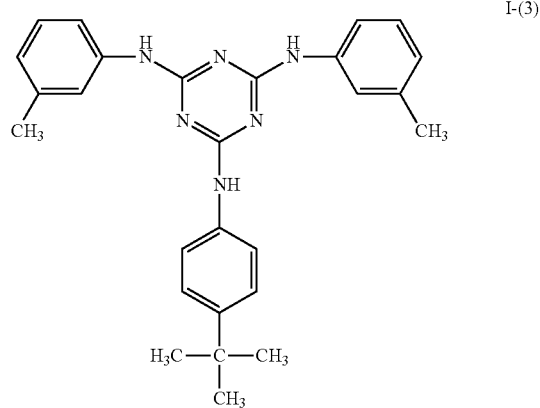
I-(3)

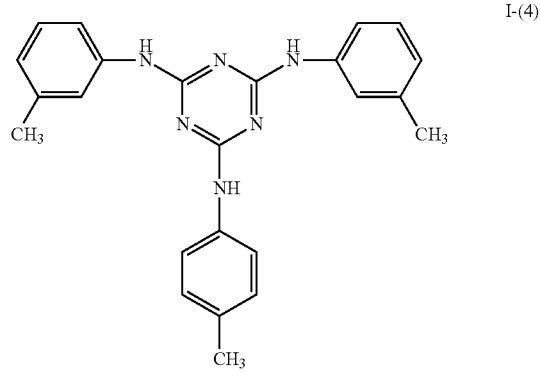
I-(4)

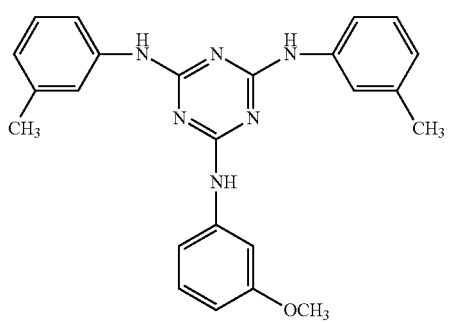
I-(5)
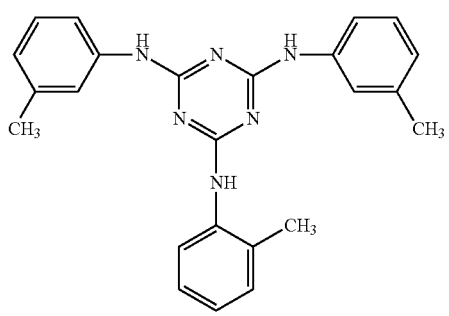
I-(6)
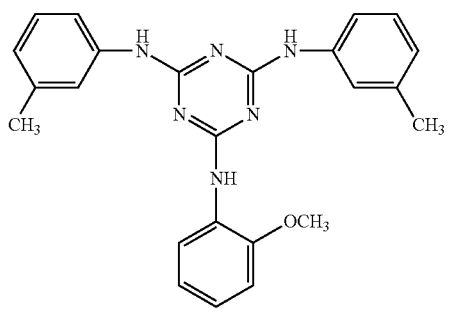
I-(7)
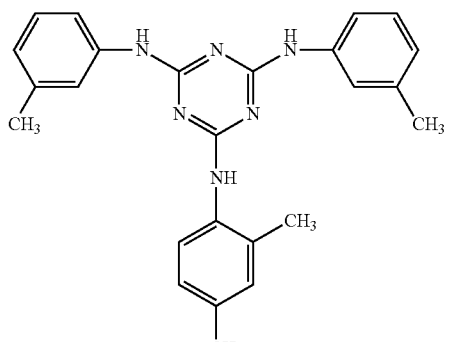
I-(8)
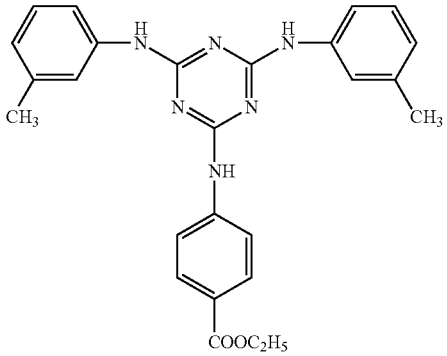
I-(9)
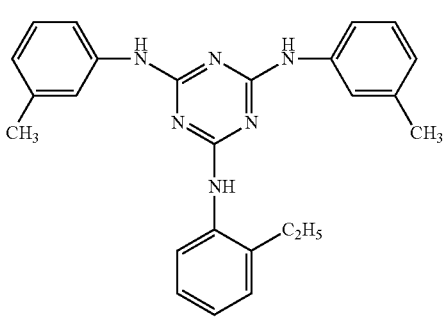
I-(10)
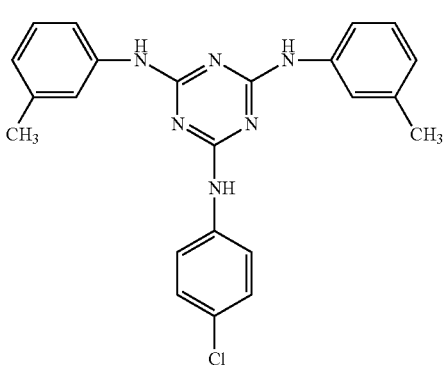
I-(11)
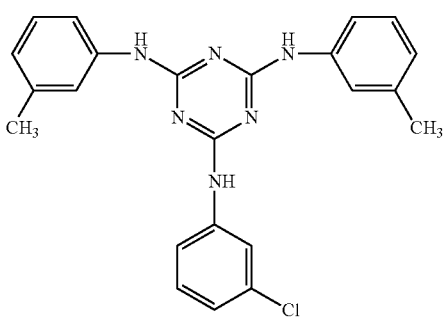
I-(12)
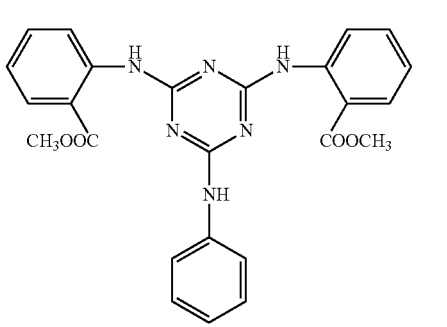
I-(13)

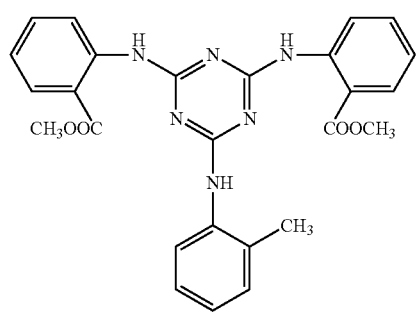
I-(14)
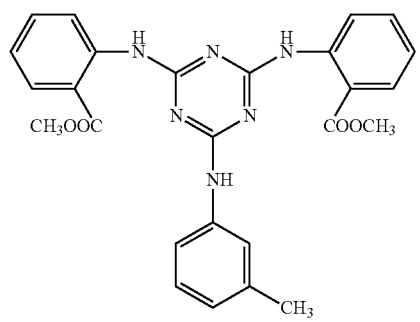
I-(15)
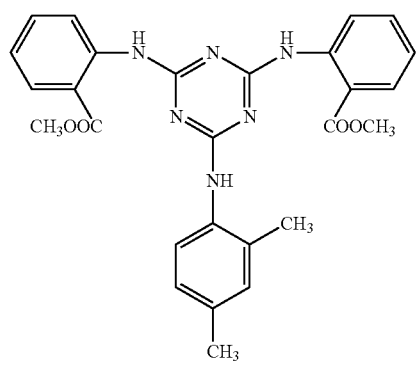
I-(16)
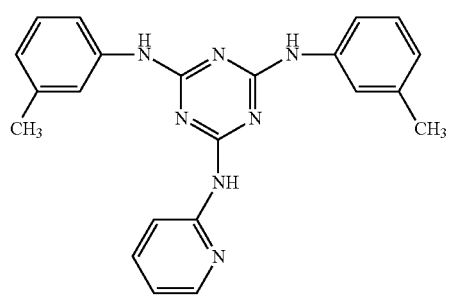
I-(17)
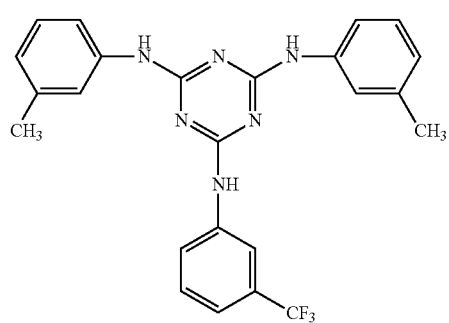
I-(18)
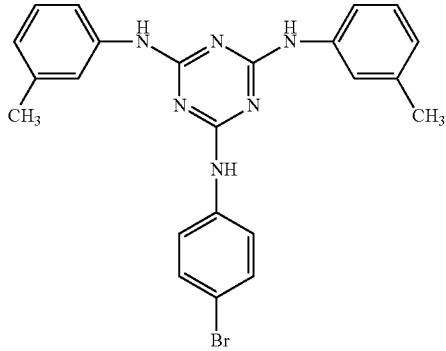
I-(19)
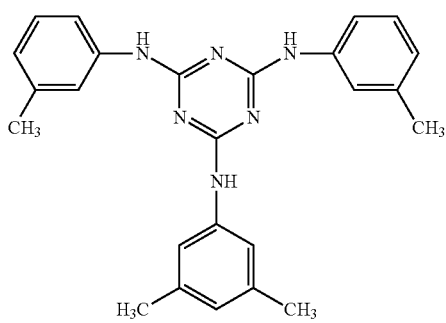
I-(20)
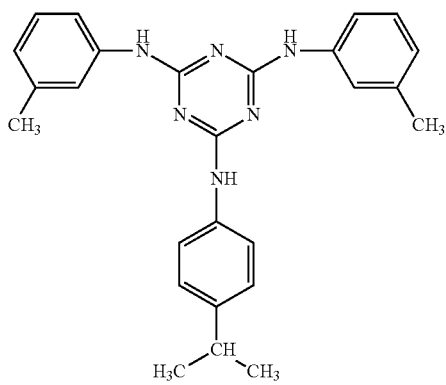
I-(21)
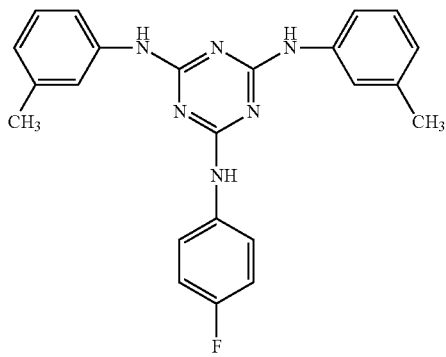
I-(22)

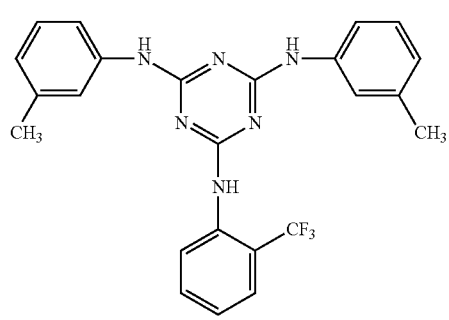
I-(23)
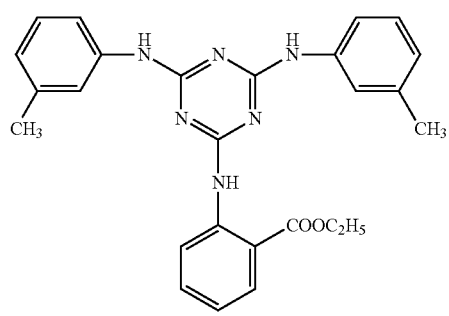
I-(24)
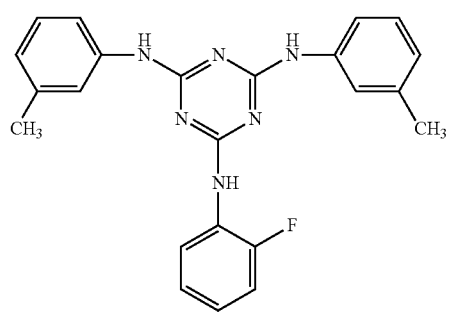
I-(25)
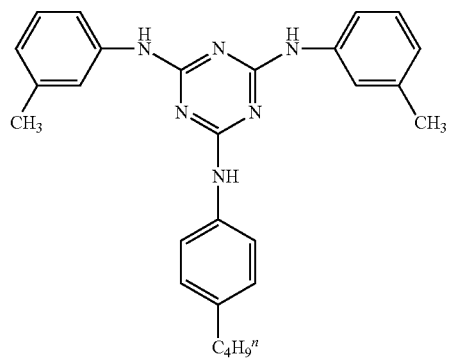
I-(26)
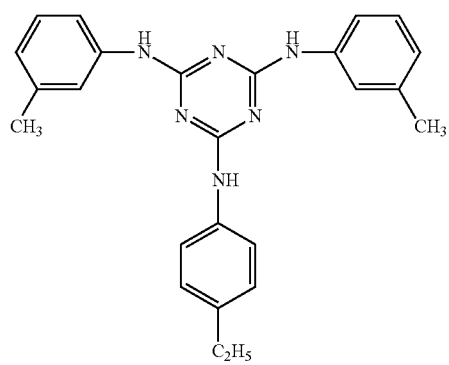
I-(27)
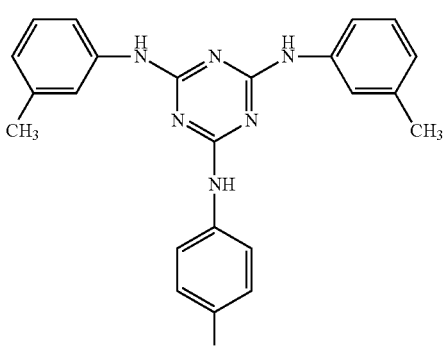
I-(28)
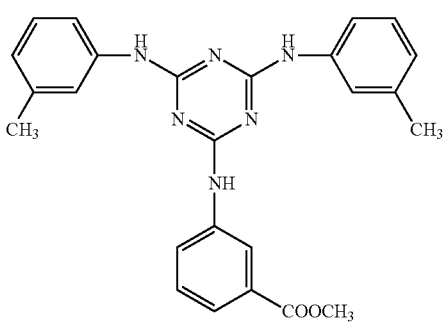
I-(29)
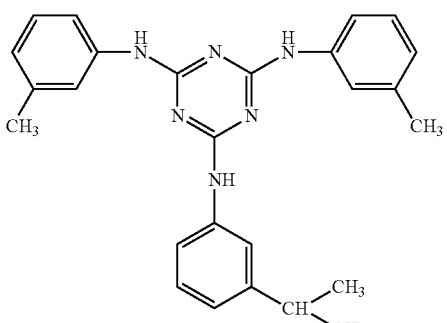
I-(30)
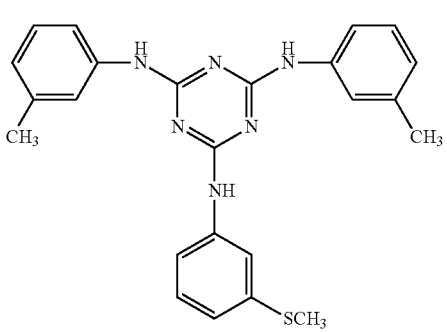
I-(31)

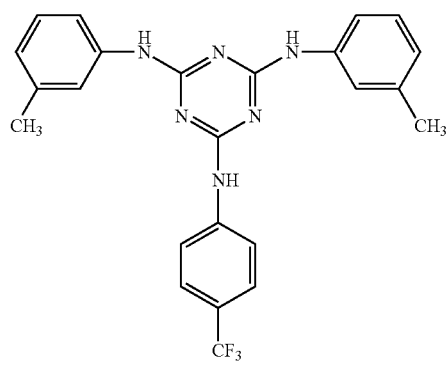
I-(32)
I-(33)
I-(34)
I-(35)
I-(36)
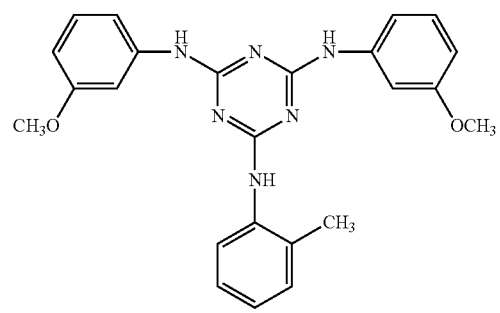
I-(37)
I-(38)
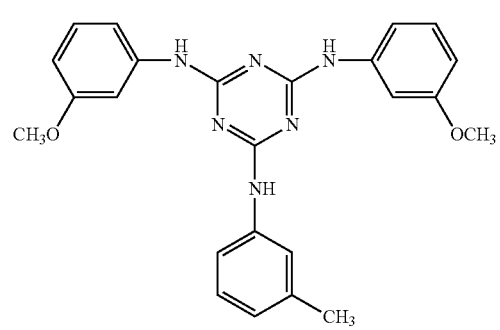
I-(39)
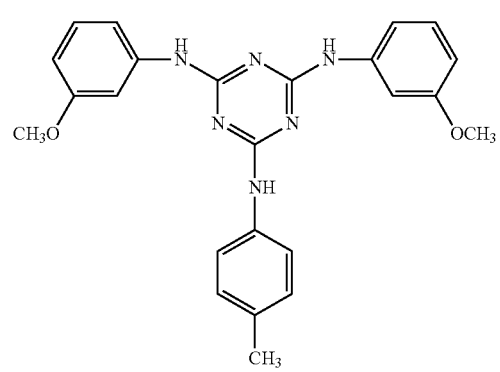
I-(40)
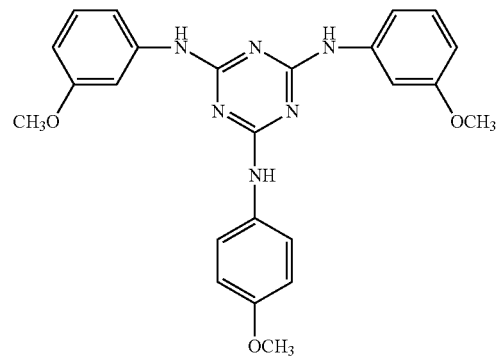

I-(41)
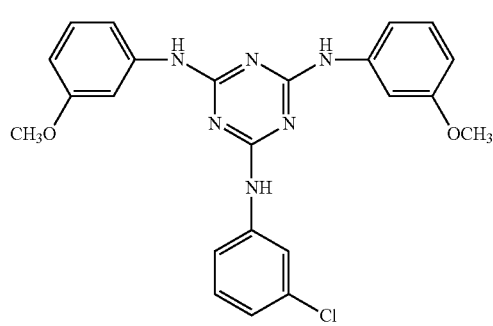
I-(42)
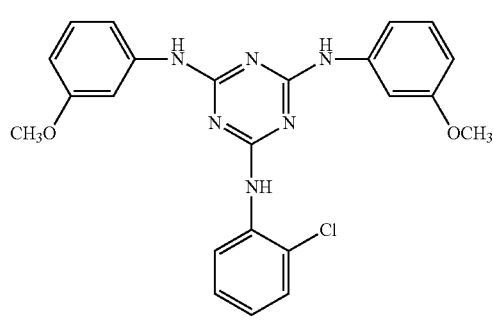
I-(43)
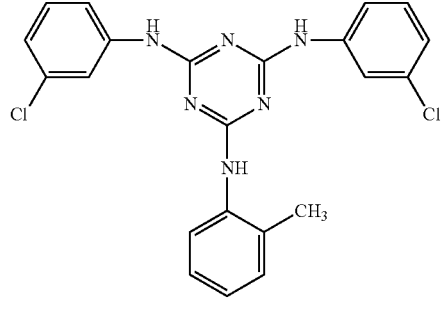
I-(44)
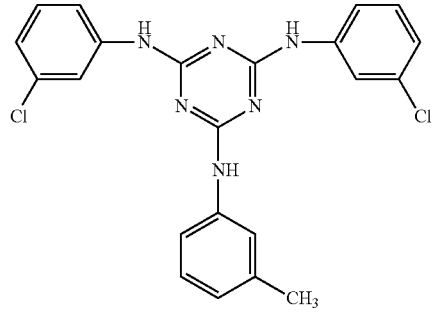
I-(45)
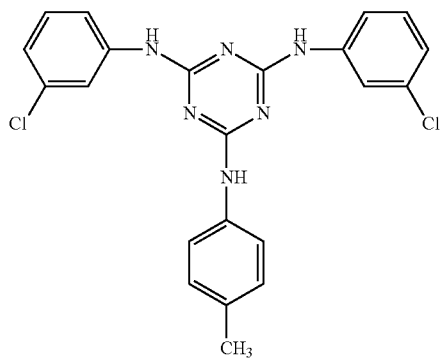
I-(46)
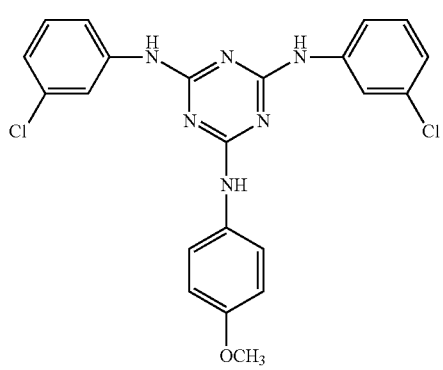
I-(47)
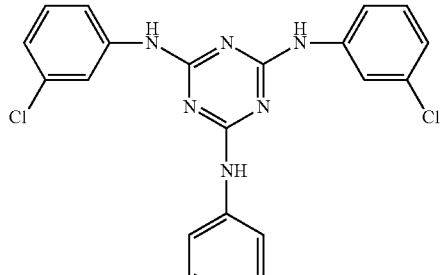
I-(48)
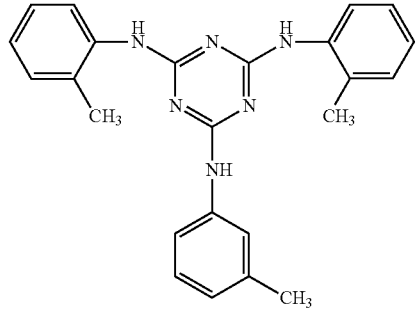

I-(49)
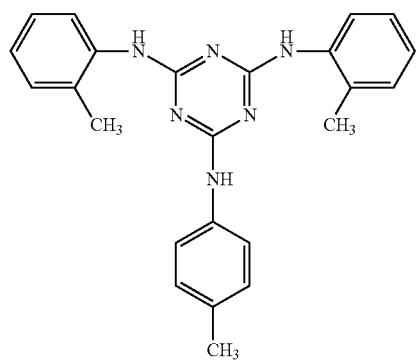
I-(50)
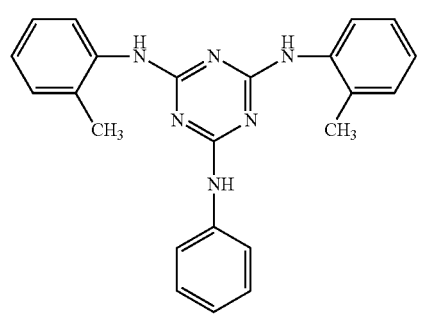
II-(1)
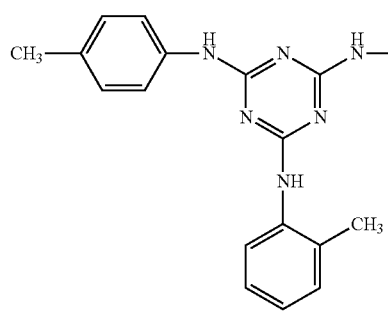
II-(2)
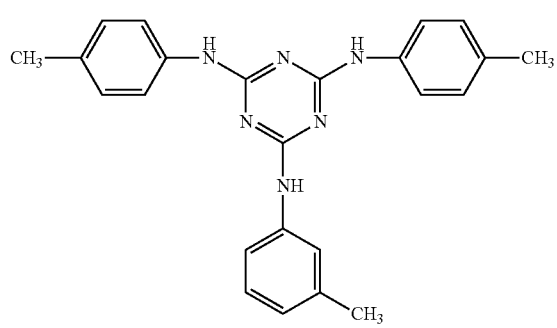
II-(3)
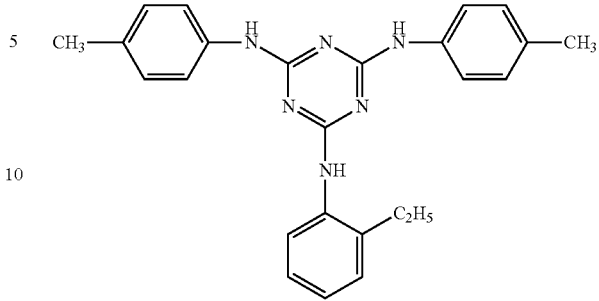
II-(4)
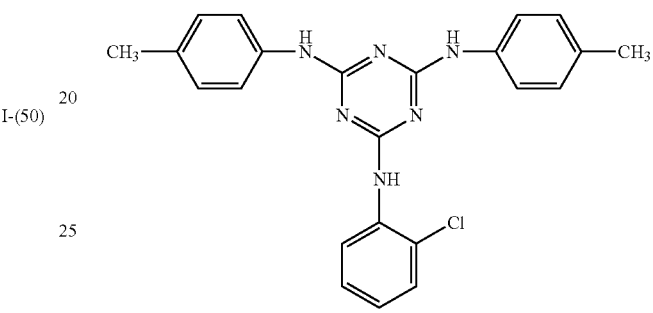
II-(5)
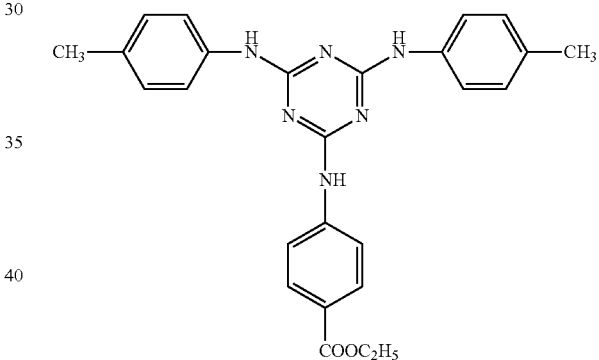
II-(6)
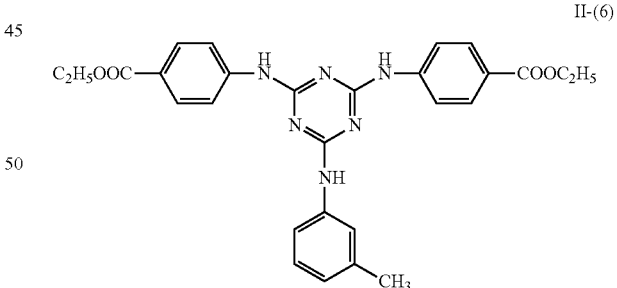
II-(7)
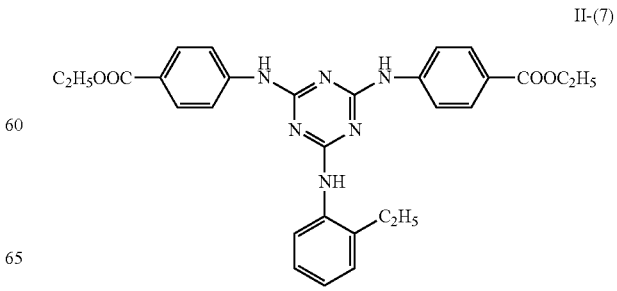

II-(8)
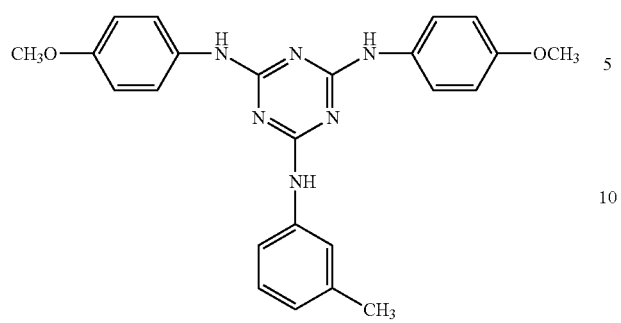
II-(9)
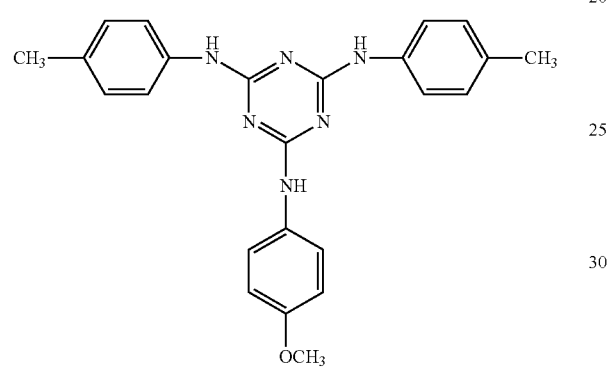
III-(1)
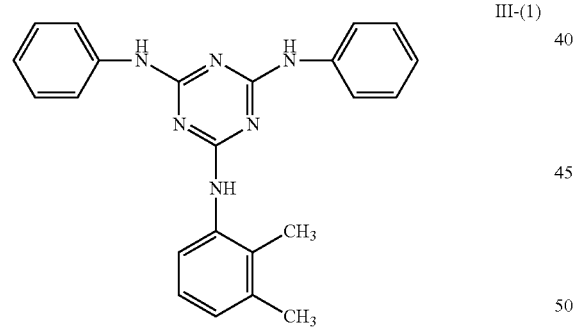
III-(2)
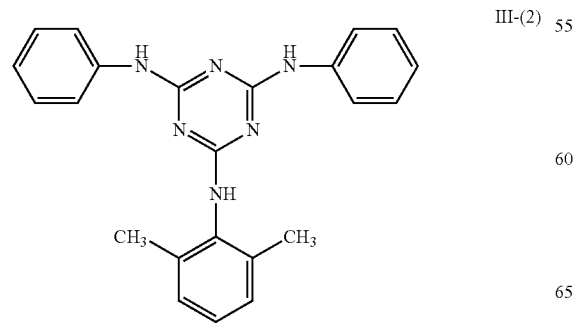
III-(3)
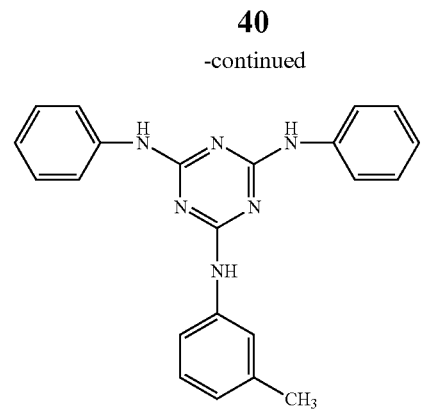
III-(4)
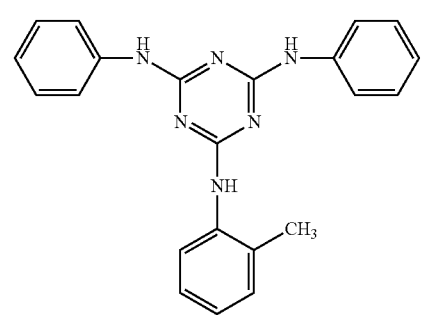
III-(5)
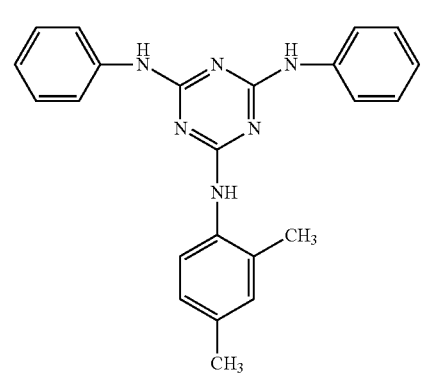
III-(6)
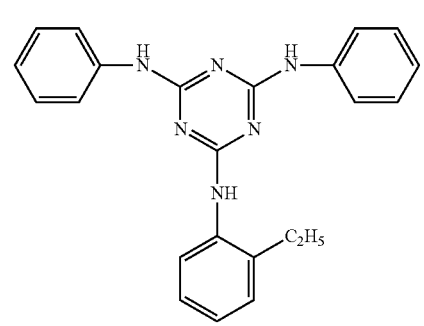
III-(7)
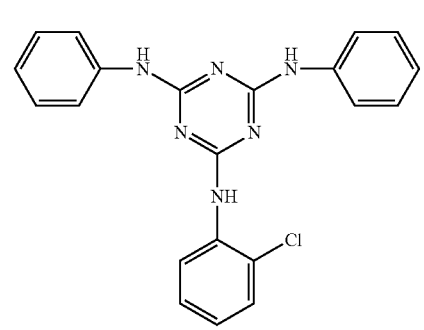

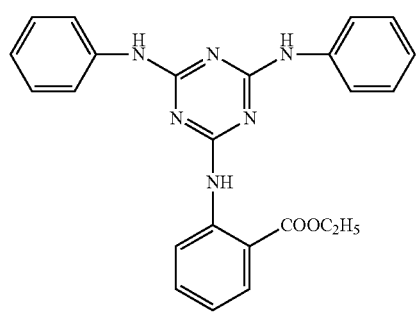 III-(8)
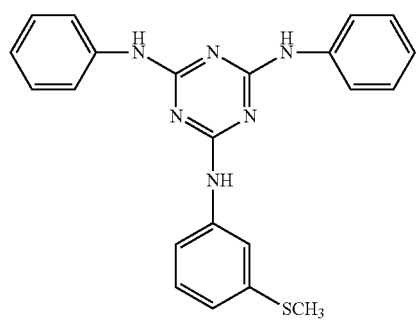 III-(9)
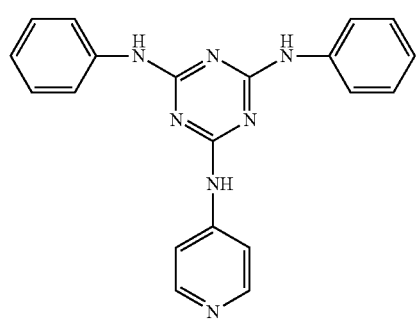 III-(10)
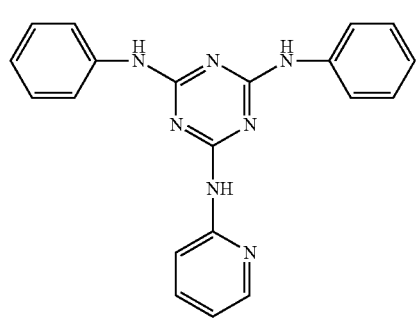 III-(11)
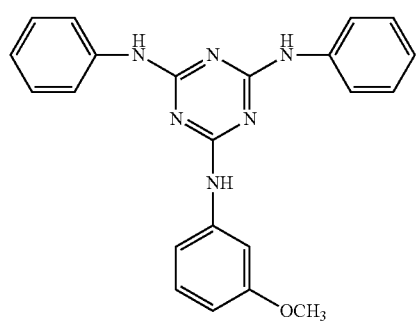 III-(12)
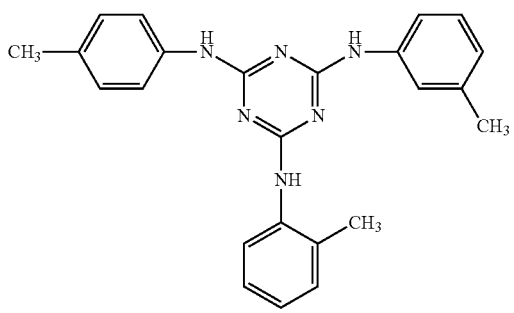 IV-(1)
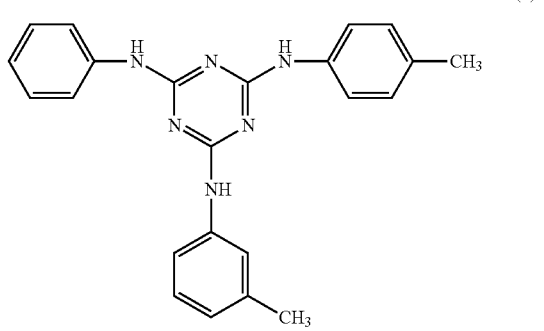 IV-(2)
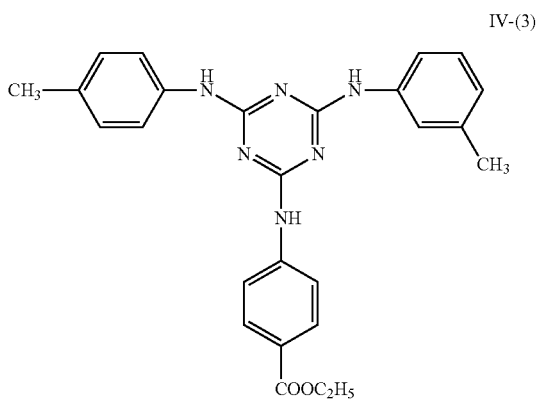 IV-(3)
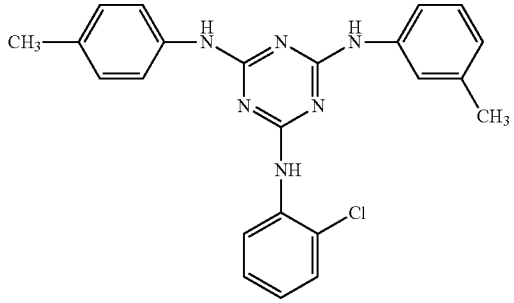 IV-(4)

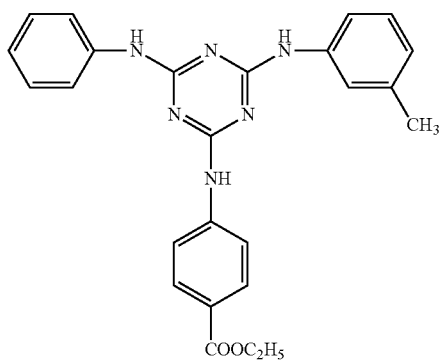

IV-(5)

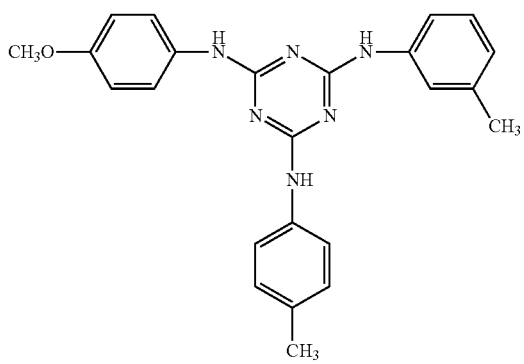

IV-(6)

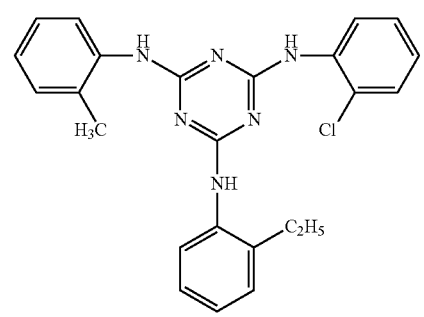

IV-(7)

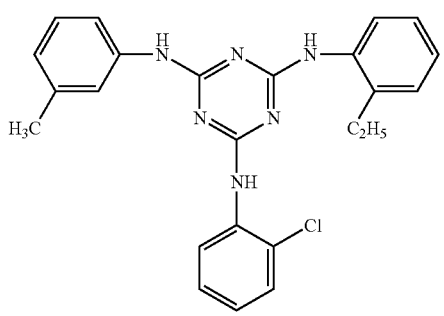

IV-(8)

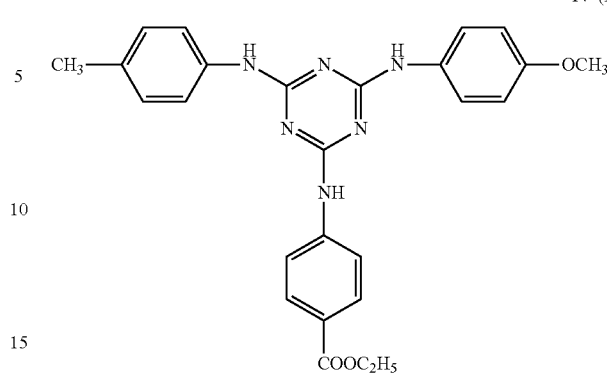

IV-(9), IV-(10)

(2) Rod-Like Compound

In the invention, the rod-like compound, that is, the compound having a straight line-like molecular structure is preferably used other than the discotic compound. Examples of the rod-like compound which can be used in the invention include those described in JP-A 2007-268898, [0053]-[0095].

(3) Positive-Birefringent Compound

A positive-birefringent compound is a polymer as follows: a layer formed of uniaxially oriented molecules of a polymer exhibits a larger refractive index relative to the light coming along the orientation direction and a smaller refractive index relative to the light coming along the perpendicular direction to the orientation direction, and in such a case, the polymer is a positive-birefringent polymer.

Such a positive-birefringent compound is not limited, and examples of the positive-birefringent compound include polymers having intrinsic positive birefringence such as polyamides, polyimides, polyesters, polyetherletones, polyamideimides and polyesterimides; polyetherketones and polyester-base polymers are preferable; and polyester-base polymers are more preferable.

The polyester-base polymers are prepared by carrying out the reaction of the mixture of $C_{2-20}$ aliphatic dicarboxylic acids and $C_{8-20}$ aromatic dicarboxylic acids with at least one diol selected from $C_{2-12}$ aliphatic diols, $C_{4-20}$ alkylether diols and $C_{6-20}$ aromatic diols. If necessary, the both terminals of the products may be blocked by carrying out the reaction with mono carboxylic acid, mono alcohol or phenol. Blocking the terminal may be carried out for avoiding contamination of any free carboxylic acid, and is preferable in terms of preservation stability. The dicarboxylic acids which can be used for preparing the polyester-base polymers are preferably $C_{4-20}$ aliphatic dicarboxylic acids or $C_{8-20}$ aromatic dicarboxylic acids.

Examples of the preferable $C_{2-20}$ aliphatic dicarboxylic acids which can be used preferable include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexane dicarboxylic acid.

Examples of $C_{8-20}$ aromatic dicarboxylic acid include phthalic acid, terephthalic acid, isophthalic acid, 1,5-naphtharene dicarboxylic acid, 1,4-naphtharene dicarboxylic acid, 1,8-naphtharene dicarboxylic acid, 2,8-naphtharene dicarboxylic acid and 2,6-naphtharene dicarboxylic acid.

Among these aliphatic dicarboxylic acids, malonic acid, succinic acid, maleic acid, fumaric acid, glutaric acid, adipic acid, azelaic acid and 1,4-cyclohexane dicarboxylic acid are preferable; and among these aromatic dicarboxylic acids, phthalic acid, terephthalic acid, isophthalic acid, 1,5-naphtharene dicarboxylic acid and 1,4-naphtharene dicarboxylic acid are preferable. Among these aliphatic dicarboxylic acids, succinic acid, glutaric acid and adipic acid are especially preferable; and among these aromatic dicarboxylic acids, phthalic acid, terephthalic acid and isophthalic acid are especially preferable.

Any combination of the above-described aliphatic dicarboxylic acid and aromatic dicarboxylic acid may be used, and the combination is not especially limited. Plural types of them may be combined respectively.

The diol or aromatic diol which can be used in the positive birefringent compound may be, for example, selected from $C_{2-20}$ aliphatic diols, $C_{4-20}$ alkylether diols and $C_{6-20}$ aromatic diols Examples of $C_{2-20}$ aliphatic diol include alkyl diols and alicyclic diols such as ethane diol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethyrol pentane), 2-n-butyl-2-ethyl-1,3-propanediol (3,3-dimethyrol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used alone or in combination with other(s).

Ethane diol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol and 1,4-cyclohexane dimethanol are preferable; and ethane diol, 1,2-propanediol, 1,3-propanediol, 1,2-butanediol, 1,3-butanediol, 1,4-butanediol, 1,5-pentanediol, 1,6-hexanediol, 1,4-cyclohexane diol and 1,4-cyclohexane dimethanol are especially preferable.

Preferable examples of $C_{4-20}$ alkylether diol include polytetramethylene ether glycol, polyethylene ether glycol, polypropylene ether glycol and any combinations thereof. The averaged polymerization degree is especially not limited, and preferably from 2 to 20, more preferably from 2 to 10, much more preferably from 2 to 5 and especially preferably from 2 to 4. Examples of such a compound include useful commercially-available polyether glycols such as Carbowax resins, Pluronics resins and Niax resins.

Examples of $C_{6-20}$ aromatic diol include, however are not limited, bisphenol A, 1,2-hydroxy benzene, 1,3-hydroxy benzene, 1,4-hydroxy benzene and 1,4-benzene dimethanol. Bisphenol A, 1,4-hydroxy benzene and 1,4-benzene dimethonal are preferable.

The positive birefringent compound is preferably the compound of which terminals are blocked by any alkyl or aryl group. Protecting the terminals with any hydrophobic group is effective for preventing time degradation under a condition of a high temperature and a high humidity, and this is because it may play a role of prolonging hydrolysis of ester groups.

For avoiding terminal OH or carboxylic acid in the positive birefringent compound, the terminal is preferably blocked with a monoalcohol residue or a monocarboxylic acid residue.

As the monoalcohol, $C_{1-30}$ substituted or non-substituted monoalcohols are preferable, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodeca hexanol, dodeca octanol, allyl alcohol and oleyl alcohol; and substituted alcohols such as benzyl alcohol and 3-phenyl propanol.

Preferable examples of the alcohol which can be used for blocking the terminals include methanol ethanol, propanol, isopropanol, butanol, isobutanol, pentanol, isopentanol, hexanol, isohexanol, cyclohexyl alcohol, isooctanol, 2-ethylhexyl alcohol, isononyl alcohol, oleyl alcohol and benzyl alcohol: and much more preferable examples thereof include methanol ethanol, propanol, isobutanol, cyclohexyl alcohol, 2-ethylhexyl alcohol, isononyl alcohol and benzyl alcohol.

When a monocarboxylic acid residue is used for blocking the terminals, monocarboxylic acid, which is used as a monocarboxylic acid residue, is preferably $C_{1-30}$ substituted or non-substituted monocarboxylic acid. It may be an aliphatic monocarboxylic acid or aromatic monocarboxylic acid. Preferable examples of the aliphatic monocarboxylic acid include acetic acid, propionic acid, butane acid, caprylic acid, caproic acid, decane acid, dodecane acid, stearic acid and oleic acid; and preferable examples of the aromatic monocarboxylic acid include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used alone or in combination with other(s).

The positive birefringent compound can be produced with ease according to any conventional method, for example, according to a polyesterification, interesterification or thermal-fusing condensation method of a dicarboxylic acid component and a diol component and/or a monocarboxylic acid or monoalcohol for blocking terminals, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A Nos. 5-155809, 5-155810, 5-197073, 2006-259494, 7-330670, 2006-342227, and 2007-3679.

Examples of the positive birefringent compound include, however are not limited to, those shown below.

|  | Dicarboxylic acid | | | Diol | | Number-averaged molecular weight |
|---|---|---|---|---|---|---|
|  | Aromatic dicarboxylic acid | Aliphatic dicarboxylic acid | Ratio of dicarboxylic acids (mol %) | Aliphatic diol | Both terminals | |
| P-1 | — | AA | 100 | Ethane diol | hydroxyl | 1000 |
| P-2 | — | AA | 100 | Ethane diol | hydroxyl | 2000 |
| P-3 | — | AA | 100 | Propane diol | hydroxyl | 2000 |
| P-4 | — | AA | 100 | Butane diol | hydroxyl | 2000 |
| P-5 | — | AA | 100 | Hexane diol | hydroxyl | 2000 |
| P-6 | — | AA/SA | 60/40 | Ethane diol | hydroxyl | 900 |
| P-7 | — | AA/SA | 60/40 | Ethane diol | hydroxyl | 1500 |
| P-8 | — | AA/SA | 60/40 | Ethane diol | hydroxyl | 1800 |
| P-9 | — | SA | 100 | Ethane diol | hydroxyl | 1500 |
| P-10 | — | SA | 100 | Ethane diol | hydroxyl | 2300 |
| P-11 | — | SA | 100 | Ethane diol | hydroxyl | 6000 |
| P-12 | — | SA | 100 | Ethane diol | hydroxyl | 1000 |
| P-13 | PA | SA | 50/50 | Ethane diol | hydroxyl | 1000 |
| P-14 | PA | SA | 50/50 | Ethane diol | hydroxyl | 1800 |
| P-15 | PA | AA | 50/50 | Ethane diol | hydroxyl | 2300 |
| P16 | PA | SA/AA | 40/30/30 | Ethane diol | hydroxyl | 1000 |
| P-17 | PA | SA/AA | 50/20/30 | Ethane diol | hydroxyl | 1500 |
| P-18 | PA | SA/AA | 50/30/20 | Ethane diol | hydroxyl | 2600 |
| P-19 | TPA | SA | 50/50 | Ethane diol | hydroxyl | 1000 |
| P-20 | TPA | SA | 50/50 | Ethane diol | hydroxyl | 1200 |
| P-21 | TPA | AA | 50/50 | Ethane diol | hydroxyl | 2100 |
| P-22 | TPA | SA/AA | 40/30/30 | Ethane diol | hydroxyl | 1000 |
| P-23 | TPA | SA/AA | 50/20/30 | Ethane diol | hydroxyl | 1500 |
| P-24 | TPA | SA/AA | 50/30/20 | Ethane diol | hydroxyl | 2100 |
| P-25 | PA/TPA | AA | 15/35/50 | Ethane diol | hydroxyl | 1000 |
| P-26 | PA/TPA | AA | 20/30/50 | Ethane diol | hydroxyl | 1000 |
| P-27 | PA/TPA | SA/AA | 15/35/20/30 | Ethane diol | hydroxyl | 1000 |
| P-28 | PA/TPA | SA/AA | 20/30/20/30 | Ethane diol | hydroxyl | 1000 |
| P-29 | PA/TPA | SA/AA | 10/50/30/10 | Ethane diol | hydroxyl | 1000 |
| P-30 | PA/TPA | SA/AA | 5/45/30/20 | Ethane diol | hydroxyl | 1000 |
| P-31 | — | AA | 100 | Ethane diol | acetyl ester residue | 1000 |
| P-32 | — | AA | 100 | Ethane diol | acetyl ester residue | 2000 |
| P-33 | — | AA | 100 | Propane diol | acetyl ester residue | 2000 |
| P-34 | — | AA | 100 | Butane diol | acetyl ester residue | 2000 |
| P-35 | — | AA | 100 | Hexane diol | acetyl ester residue | 2000 |
| P-36 | — | AA/SA | 60/40 | Ethane diol | acetyl ester residue | 900 |
| P-37 | — | AA/SA | 60/40 | Ethane diol | acetyl ester residue | 1000 |
| P-38 | — | AA/SA | 60/40 | Ethane diol | acetyl ester residue | 2000 |
| P-39 |  | SA | 100 | Ethane diol | acetyl ester residue | 1000 |
| P-40 | — | SA | 100 | Ethane diol | acetyl ester residue | 3000 |
| P-41 | — | SA | 100 | Ethane diol | acetyl ester residue | 5500 |
| P42 | — | SA | 100 | Ethane diol | acetyl ester residue | 1000 |
| P-43 | PA | SA | 50/50 | Ethane diol | acetyl ester residue | 1000 |
| P-44 | PA | SA | 50/50 | Ethane diol | acetyl ester residue | 1500 |
| P-45 | PA | AA | 50/50 | Ethane diol | acetyl ester residue | 2000 |
| P-46 | PA | SA/AA | 40/30/30 | Ethane diol | acetyl ester residue | 1000 |
| P-47 | PA | SA/AA | 33/33/34 | Ethane diol | benzoic acid | 1000 |
| P-48 | PA | SA/AA | 50/20/30 | Ethane diol | acetyl ester residue | 1500 |
| P-49 | PA | SA/AA | 50/30/20 | Ethane diol | acetyl ester residue | 2000 |
| P-50 | TPA | SA | 50/50 | Ethane diol | acetyl ester residue | 1000 |
| P-51 | TPA | SA | 50/50 | Ethane diol | acetyl ester residue | 1500 |
| P-52 | TPA | SA | 45/55 | Ethane diol | acetyl ester residue | 1000 |
| P-53 | TPA | AA | 50/50 | Ethane diol | acetyl ester residue | 2200 |
| P-54 | TPA | SA | 35/65 | Ethane diol | acetyl ester residue | 1000 |
| P-55 | TPA | SA/AA | 40/30/30 | Ethane diol | acetyl ester residue | 1000 |
| P-56 | TPA | SA/AA | 50/20/30 | Ethane diol | acetyl ester residue | 1500 |
| P-57 | TPA | SA/AA | 50/30/20 | Ethane diol | acetyl ester residue | 2000 |
| P-58 | TPA | SA/AA | 20/20/60 | Ethane diol | acetyl ester residue | 1000 |
| P-59 | PA/TPA | AA | 15/35/50 | Ethane diol | acetyl ester residue | 1000 |
| P-60 | PA/TPA | AA | 25/25/50 | Ethane diol | acetyl ester residue | 1000 |
| P-61 | PA/TPA | SA/AA | 15/35/20/30 | Ethane diol | acetyl ester residue | 1000 |
| P-62 | PA/TPA | SA/AA | 20/30/20/30 | Ethane diol | acetyl ester residue | 1000 |
| P-63 | PA/TPA | SA/AA | 10/50/30/10 | Ethane diol | acetyl ester residue | 1000 |
| P-64 | PA/TPA | SA/AA | 5/45/30/20 | Ethane diol | acetyl ester residue | 1000 |
| P-65 | PA/TPA | SA/AA | 5/45/20/30 | Ethane diol | acetyl ester residue | 1000 |
| P-66 | IPA | AA/SA | 20/40/40 | Ethane diol | acetyl ester residue | 1000 |
| P-67 | 2,6-NPA | AA/SA | 20/40/40 | Ethane diol | acetyl ester residue | 1200 |
| P-68 | 1,5-NPA | AA/SA | 20/40/40 | Ethane diol | acetyl ester residue | 1200 |
| P-69 | 1,4-NPA | AA/SA | 20/40/40 | Ethane diol | acetyl ester residue | 1200 |
| P-70 | 1,8-NPA | AA/SA | 20/40/40 | Ethane diol | acetyl ester residue | 1200 |
| P-71 | 2,8-NPA | AA/SA | 20/40/40 | Ethane diol | acetyl ester residue | 1200 |

In Tables, PA means phthalic acid; TPA means terephthalic acid; IPA means isophthalic acid; AA means adipic acid; SA means succinic acid; 2,6-NPA means 2,6-naphthalene dicarboxylic acid; 2,8-NPA means 2,8-naphthalene dicarboxylic acid; 1,5-NPA means 1,5-naphthalene dicarboxylic acid; 1,4-NPA means 1,4-naphthalene dicarboxylic acid; and 1,8-NPA means 1,8-naphthalene dicarboxylic acid.

An amount of such the positive birefringent compound is preferably from 1 to 30 parts by mass, more preferably from 4 to 25 parts by mass and much more preferably from 10 to 20 parts by mass with respect to 100 parts by mass of the cellulose acylate.

The cellulose acylate solution to be used for preparing the cellulose acylate-base film may be added with any additive other than the retardation enhancer. Examples of another additive include antioxidants, UV inhibitors, peeling promoters, plasticizers, agents for controlling wavelength-dispersion, fine particles and agents for controlling optical properties. They may be selected from any known additives.

The cellulose acylate solution for the rear-side or front-side retardation region may be added with any plasticizer in order to improve the mechanical properties of the prepared film or the drying rate. Examples of the plasticizer which can be used in the invention include those described in JP-A 2008-181105, [0067].

For preparing the cellulose acylate-base film satisfying the formula (Ia), one or more additives described in JP-A 2006-184640, [0026]-[0218] may be used. The preferred range of the additive is as same as that described in the publication.

Acryl-Base Polymer Film:

The acryl-base polymer film which can be used in the invention is a film containing an acryl-base polymer having at least one repeating unit of (meth)acrylic acid ester as a major ingredient. Preferable examples of the acryl-base polymer include acryl-base polymers having at least one unit selected from the group consisting of lactone ring unit, maleic acid anhydride unit and glutaric anhydride together with at least one repeating unit of (meth)acrylic acid ester. Such acryl-base polymers are described in detail in JP-A 2008-9378, to which can be referred.

As another polymer, cellulose-base polymer is preferably added to the acryl-base polymer film; and in such an embodiment, they may be act in a complementary system, and the mixed materials may have any desired properties. An amount of the cellulose-base polymer is preferably from about 5 to about 40% by mass with respect to the total mass of all polymers. Usually, an acryl-base polymer film has a low moisture-permeability, and therefore, residual water is hardly to be removed after producing a polarizing plate. On the other hand the acryl-base polymer film containing cellulose-base polymer may have an appropriate moisture-permeability. Examples of such the acryl-base polymer film include the film containing cellulose acylate by an amount of 10% by mass, described in Table 4 hereinafter, and films containing cellulose acylate propionate ("CAP482-20" manufactured by Eastman Chemical) by an amount of 30% by mass.

Cycloolefin-Base Polymer Film:

Regarding the materials and methods employing the materials for preparing the cycloolefin-base polymer film, details are described in JP-A 2006-293342, [0098]-[0193], which can be referred to in the invention. Examples of the retardation film, constituting the second retardation region, include norbornene-base polymers such as ARTON (manufactured by JSR Corporation, and ZEONOR (manufactured by ZEON Corporation).

Various methods may be used for producing the retardation film constituting the rear-side or front-side retardation region.

For example, a solution casting method, melt-extrusion method, calendar method or condensing forming method may be used. Among these, a solution casting method and melt-extrusion method are preferable. And the retardation film constituting the second retardation region may be a film prepared by being subjected to a stretching treatment after forming. Stretching the film may be carried out according to a monoaxially or biaxially stretching method. Simultaneously- or successively-biaxially stretching is preferable. For achieving high optical anisotropy, a film should be subjected to a stretching treatment by a high stretching ratio. For example, the film is preferably subjected to a stretching treatment in both of the width direction and the lengthwise direction (machine direction). The stretching ratio is preferably from 3 to 100%. The stretching treatment may be carried out by using a tenter. Or the longitudinally stretching treatment may be carried out between the rolls.

The retardation film constituting the rear-side or front-side retardation region may be a layer formed of a liquid crystal composition fixed in a desired alignment state, or a lamination containing such a layer and a polymer film supporting the layer. In the latter embodiment, the polymer film may be used as a protective film of the polarizing element. Examples of the liquid crystal which can be used for preparing the retardation film constituting the front-side retardation region include rod-like liquid crystals, discotic liquid crystals and cholesteric liquid crystals.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a delivery valve (geeser) for casting, then peeled off from the support at an appropriate time, and then dried to form a film.

According to a solution successive-casting method, at first, a dope of the first layer is extruded from the delivery valve (geeser) for casting to be cast on a support; and, after being dried or not being dried, then a dope for the second layer is extruded from the delivery valve (geeser) for casting to be cast on the first layer. And if necessary, the three or more dopes are successively cast and laminated in this manner, then removed from the support at the appropriate time, and dried to form a film.

According to a coating method, generally, a core layer is prepared according to a solution casting method. And then, a prepared coating liquid is applied to the surfaces of the core layer respectively or simultaneously by using an appropriate apparatus and dried to form a layered film.

For reducing unevenness at the corner-side, it is necessary to reduce the deformation of the retardation film caused by external force to be applied to the film. The thickness of the retardation film disposed at the rear-side, constituting the second retardation region is preferably equal to or more than 20 micro meters and equal to or less than 200 micro meters, in terms of reducing unevenness at the corner-side and improving the productivity. Details regarding unevenness at the corner-side are described in JP-A 2009-69720.

2. Polarizing Element

The polarizing element disposed at the front-side or rear-side is not limited. Any normal linear polarizing film can be used. The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

3. Protective Film

To the both surfaces of the front-side or rear-side polarizing element, a protective film is preferably bonded. Each of the protective films disposed at the liquid crystal cell side constitutes a part of the rear-side or front-side retardation regions, and the former is required to satisfy the above formula (I). The latter constitutes a part of the front-side retardation region, and in some embodiments, it is required to exhibit the optical properties, which can contribute to improving the viewing angle CR, alone or in combination with other layer(s).

The protective film disposed on the outside of the front-side or rear-side polarizing element is especially not limited. Any polymer films may be used. Examples of the film are same as those which are exemplified above as examples of the retardation film constituting the first retardation region. For example, films containing cellulose acylate (e.g., cellulose acetate, cellulose propionate and cellulose butyrate), polyolefin (e.g., norbornene-base polymer, and polypropylene), poly (meth)acrylic acid ester (e.g., polymethylmethacrylate), polycarbonate, polyester or polysulfones as a major ingredient are exemplified. Commercially available polymer films (e.g., regarding cellulose acylate film, "TD80UL" (manufactured by FUJIFILM), and regarding norbornene-base polymer film, ARTON (manufactured by JSR) and ZEONOR (manufactured by NIPPON ZEON)) can be also used.

EXAMPLES

The invention is described in more detail with reference to the following Examples. In the following Examples, an amount of the material, reagent and substance used, their ratio, the operation with them and the like may be suitably modified or changed not overstepping the spirit and the scope of the invention. Accordingly, the scope of the invention should not be limited to the following Examples.

1. Production Methods for Films:

(1) Preparation of Film 1:

A commercially-available cellulose acylate film, "Z-TAC" (trade name by FUJIFILM) was prepared, and this was use as Film 1.

(2) Preparation of Film 2:

A stretched film (protective film A) was produced according to the description in [0223] to [0226] in JP-A 2007-127893. According to the description in [0232] in the patent publication, an easy-adhesion layer coating composition P-2 was prepared, and the composition was applied onto the surface of the stretched film, protective film A, according to the method described in [0246] in the patent publication, thereby forming an easy-adhesion layer thereon. The film was used as Film 2.

(3) Preparation of Film 3:

The surface of a commercially-available norbornene polymer film, "ZEONOR ZF14-060" (by Optes) was processed for corona discharge treatment, using a solid state corona discharger, 6 KVA (by Pillar). This was used as Film 3. The thickness of the film was 60 μm.

(4) Preparation of Film 4:

A commercially-available cycloolefin polymer film, "ARTON FLZR50" (by JSR) was processed for corona discharge treatment on the surface thereof. This was used as Film 4. The thickness of the film was 50 μm.

(5) Preparation of Film 5:

The following ingredients were put into a mixing tank and stirred under heat to dissolve the ingredients, thereby preparing a cellulose acylate solution.

<Formulation of Cellulose Acylate Solution>

| | |
|---|---|
| Cellulose acylate having a degree of substitution of 2.86 | 100 mas. pts. |
| Methylene chloride (first solvent) | 300 mas. pts. |
| Methanol (second solvent) | 54 mas. pts. |
| 1-Butanol | 11 mas. pts. |

The following ingredients were put into a different mixing tank, and stirred under heat to dissolve the ingredients, thereby preparing an additive solution.

<Composition of Additive Solution>

| | |
|---|---|
| Methylene chloride | 80 mas. pts. |
| Methanol | 20 mas. pts. |
| Optical anisotropy reducer A-7 mentioned below | 40 mas. pts. |

Optical Anisotropy Reducer A-7:

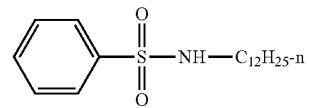

40 parts by mass of the additive solution was added to 465 parts by mass of the cellulose acylate solution to prepare a dope. The transparency of the dope solution was at least 85% and was good.

The dope was cast onto a support to form a cellulose acylate film having a thickness of 80 μm. This was used as Film 5.

(5) Preparation of Film 6:

A commercially-available cellulose acylate film, "Fujitac TD80UL" (trade name by FUJIFILM) was prepared, and this was used as Film 6.

(7) Preparation of Film 7:

A commercially-available norbornene polymer film, "ZEONOR ZF14-100" (by Optes) was biaxially stretched at a temperature of 153 degrees Celsius in MD by 1.5 times and in TD by 1.5 times with its edges kept fixed, and then its surface was processed for corona discharge treatment. The film was used as Film 17. The thickness of the film was 45 μm.

(8) Preparation of Film 8:

A film having a thickness of 34 μm was produced according to the same method as that for the film sample 201 described in JP-A 2009-63983. This was used as Film 8.

(9) Preparation of Film 9:

A cellulose acylate having an acyl group and a degree of acyl substitution shown in the following Table was prepared. Concretely, a catalyst, sulfuric acid (in an amount of 7.8 parts by mass relative to 100 parts by mass of cellulose) was added to cellulose, and then a carboxylic acid to give the acyl group was added thereto, and the cellulose was acylated at 40 degrees Celsius. In this, the type and an amount of the carboxylic acid were changed to thereby change and control the type of the acyl group and the degree of substitution with the acyl group. After the acylation, the product was aged at 40 degrees Celsius. The low-molecular component was removed from the cellulose acylate by washing with acetone. In the Table, Ac means an acetyl group, and CTA means cellulose triacetate (cellulose ester derivative in which the acyl groups are all acetate groups).

(Cellulose Acylate Solution)

The following ingredients were put into a mixing tank and stirred to dissolve the ingredients. After heated at 90 degrees Celsius for about 10 minutes, this was filtered through a paper filter having a mean pore size of 34 μm and a sintered metal filter having a mean pore size of 10 μm.

| Cellulose Acylate Solution | |
|---|---|
| CTA shown in the Table below | 100.0 mas. pts. |
| Triphenyl phosphate (TPP) | 7.8 mas. pts. |
| Biphenyldiphenyl phosphate (BDP) | 3.9 mas. pts. |
| Methylene chloride | 403.0 mas. pts. |
| Methanol | 60.2 mas. pts. |

(Mat Agent Dispersion)

The following composition containing the cellulose acylate solution that had been prepared according to the above method was put into a disperser and dispersed to prepare a mat agent dispersion.

| Mat Agent Dispersion | |
|---|---|
| Silica particles having a mean particle size of 16 nm (Aerosil R972, by Nippon Aerosil) | 2.0 mas. pts. |
| Methylene chloride | 72.4 mas. pts. |
| Methanol | 10.8 mas. pts. |
| Cellulose acylate solution | 10.3 mas. pts. |

(Additive Solution)

The following composition containing the cellulose acylate solution that had been prepared according to the above method was put into a mixing tank and dissolved by stirring under heat to prepare an additive solution.

| Additive Solution | |
|---|---|
| Retardation enhancer (1) | 20.0 mas. pts. |
| Methylene chloride | 58.3 mas. pts. |
| Methanol | 8.7 mas. pts. |
| Cellulose acylate solution | 12.8 mas. pts. |

100 parts by mass of the cellulose acylate solution, 1.35 parts by mass of the mat agent dispersion, and the additive solution in such an amount that an amount of the retardation enhancer (1) in the cellulose acylate film to be formed could be 10 parts by mass were mixed to prepare a dope for film formation. An amount of the additive is by mass relative to 100 parts by mass of an amount of the cellulose acylate.

The abbreviations of the additive and the plasticizer in the following Table are as follows:
CTA: triacetyl cellulose
TPP: triphenyl phosphate
BDP: biphenyldiphenyl phosphate
Retardation Enhancer (1):

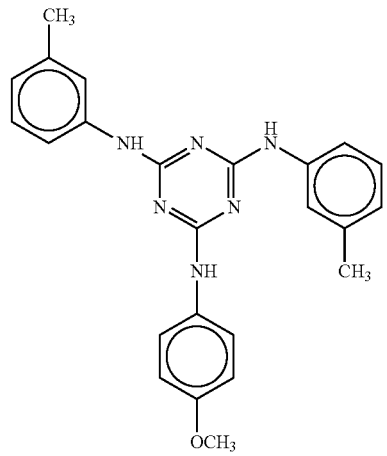

Using a band caster, the above dope was cast. The film having a residual solvent amount shown in the following Table was peeled away from the band, and in the section from the peeling to the tenter, this was stretched in the machine direction at the draw ratio shown in the following Table, and then, using a tenter, stretched in the transverse direction at the draw ratio shown in the following Table. Immediately after the transverse stretching, the film was shrunk (relaxed) in the transverse direction at the ratio shown in the following Table, and then the film was removed from the tenter. The process gave a cellulose acylate film. The residual solvent amount in the film removed from the tenter was as in the following Table. Both edges of the film were trimmed away just before the winding zone to make the film have a width of 2000 mm, and the film was wound up into a roll film having a length of 4000 m. The draw ratio in stretching is shown in the following Table.

| | Cellulose acylate film | Film 9 |
|---|---|---|
| Cellulose acylate | Cellulose Type | CTA |
| | Total degree of substitution | 2.87 |
| | Ratio of 6-positoon substitution | 0.316 |
| | Degree of 6-position substitution | 0.907 |
| | Substituent | Ac |
| Additive | Additive type | Retardation enhancer (1) |
| | Amount [parts by mass relative to 100 parts by mass of cellulose] | 1.4 |
| Plasticizer | Plasticizer type | TPP/BDP |
| | Amount [parts by mass relative to 100 parts by mass of cellulose] | 7.8/3.9 |
| Stretching condition | Ratio of longwise stretching [%] | 1 |
| | Ratio of cross stretching [%] | 5 |
| | Ratio of shrinking [%] | 1 |
| | Stretching speed [%/min] | 70 |
| | Film surface temperature [° C.] | 120 |
| | Amount of residual solvent at the time of peeling off [%] | 75 |
| | Amount of residual solvent at the time of termination of stretching [%] | 20 |

Thus produced, the cellulose acylate film was used as Film 9.

(10) Preparation of Film 10:

A cellulose acylate-base film was prepared in the same manner as Film 9, except that an amount of the retardation enhancer (1) was changed from 1.4 parts by mass to 1.5 parts by mass. This was used as Film 10.

(11) Preparation of Film 11:

A film was prepared in the same manner as Film 9, except that the final thickness of the film was changed. This was used as Film 11.

(12) Preparation of Film 12:

A film was prepared in the same manner as Film 10, except that the final thickness of the film was changed. This was used as Film 12.

(13) Preparation of Film 13:

(Cellulose Acylate Solution for Low-Substitution Layer)

The following ingredients were put into a mixing tank, stirred under heat to dissolve the ingredients, and filtered with a paper-filter having a mean pore diameter of 34 µm and a sintered-metal filter having a pore diameter of 10 µm, thereby preparing a cellulose acylate solution for low-substitution layer.

| | |
|---|---|
| Cellulose acetate having a degree of substitution of 2.43 | 100.0 mas. pts. |
| Retardation enhancer (2) | 18.5 mas. pts. |
| Methylene chloride | 365.5 mas. pts. |
| Methanol | 54.6 mas. pts. |

The composition of the retardation enhancer (2) is shown in the following Table. In the following Table, EG means ethylene glycol, PG means propylene glycol, BG means butylene glycol, TPA means terephthalic acid, PA means phthalic acid, AA means adipic acid, SA means succinic acid. The retardation enhancer (2) is a non-phosphate compound, and is a compound functioning as a retardation enhancer. The terminal of the retardation enhancer (2) is blocked with an acetyl group.

| | | Glycol unit | | | Dicarboxylic acid unit | | | |
|---|---|---|---|---|---|---|---|---|
| Retardation enhancer | Ratio of blocking both terminal hydroxyls(%) | EG (%) | PG (%) | Averaged number of carbon atoms | TPA (mole %) | SA (mole %) | Averaged number of carbon atoms | Molecular weight |
| (2) | 100 | 50 | 50 | 2.5 | 55 | 45 | 6.2 | 730 |

(Cellulose Acylate Solution for High-Substitution Layer)

The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 70 µm from the cellulose acylate solution for low-substitution layer and to form a skin layer A and a skin layer B each having a thickness of 2 µm from the cellulose acylate solution for high-substitution layer. The formed film was peeled away from the band, clipped, and stretched in the transverse direction by 40% at a temperature of 180 degrees Celsius while the residual solvent amount was 20% relative to the total mass of the film, using a tenter. Next, the film was unclipped and dried at 130 degrees Celsius for 20 minutes. In the way, a film was prepared. This was used as Film 13.

(14) Preparation of Film 14:

A cellulose acylate-base film was prepared in the same manner as Film 9, except that the cellulose acylate to be used changed, an amount of the retardation enhancer (1), and the condition of stretching were changed to those shown in the following table. This film was used as Film 14. The abbreviations of the additive and the plasticizer mentioned below are the same as above.

| | Cellulose acylate film | Film 14 |
|---|---|---|
| Cellulose Acylate | Cellulose Type | CTA |
| | Total degree of substitution | 2.81 |
| | Ratio of 6-position substitution | 0.320 |
| | Degree of 6-position substitution | 0.9 |
| | Substituent | Ac |
| Additive | Additive Type | Retardation enhancer (1) |
| | Amount [parts by mass relative to 100 parts by mass of cellulose] | 2.2 |
| Plasticizer | Plasticizer Type | TPP/BDP |
| | Amount [parts by mass relative to 100 parts by mass of cellulose] | 7.8/3.9 |
| Stretching condition | Ratio of longwise stretching [%] | 6 |
| | Ratio of cross stretching [%] | 47 |
| | Ratio of shrinking [%] | 7 |
| | Stretching speed [%/min] | 35 |
| | Film surface temperature [° C.] | 120 |

-continued

| Cellulose acylate film | | Film 14 |
|---|---|---|
| | Amount of residual solvent at the time of peeling off [%] | 55 |
| | Amount of residual solvent at the time of termination of stretching [%] | 12 |

(15) Preparation of Film 15:

(Cellulose Acylate Solution for Low-Substitution Layer)

The following ingredients were put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 17.0 mas. pts. |

-continued

| Methylene chloride | 361.8 mas. pts. |
| Methanol | 54.1 mas. pts. |

(Cellulose Acylate Solution for High-Substitution Layer)

The following ingredients were put into a mixing tank and stirred to dissolve the ingredients, thereby preparing a cellulose acylate solution for high-substitution layer.

| ellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 114 μm from the cellulose acylate solution for low-substitution layer and to form a skin layer A and a skin layer B each having a thickness of 2 μm from the cellulose acylate solution for high-substitution layer. The formed film was peeled away from the band, clipped, and fed by a tenter at 170 degrees Celsius while the residual solvent amount was 20% relative to the total mass of the film, using a tenter. Next, the film was unclipped, dried at 130 degrees Celsius for 20 minutes, and stretched transversely by a stretching ratio of 23% at a stretching temperature of 180 degrees Celsius, thereby giving a film. This was used as Film 15.

The production of Film 15 was free from the problems with the production of Film 18 (smoking in high-temperature treatment in the drying step, adhesion of vaporized oil to the parts of the machine to cause operation failure or adhesion thereof to film to cause surface failure of the film).

This is because the retardation enhancer (2) used in the production of Film 18 functions also as a plasticizer, and therefore, the production of Film 15 does not require the conventional low-molecular-weight plasticizers TPP and BDP as in the production of Film 18.

Use of the compound having a positive birefringence such as the retardation enhancer (2) solves the above-mentioned problems, and therefore, it may be said that the compound having a positive birefringence is a preferred retardation enhancer for film production.

(16) Preparation of Film 16:

Cellulose acylate propionate, "CAP482-20" (by Eastman Chemical, having a degree of acetyl substitution of 0.2 and a degree of propionyl substitution of 2.4) was prepared. A plasticizer, 1,4-phenylene-tetraphenyl phosphate (8% by mass) and an antiaging agent (antioxidant), "IRGANOX-1010" (by Ciba Specialty Chemicals) (0.5% by mass) were added thereto, and mixed for 30 minutes with a tumbler mixer. The resulting mixture was dried with a moisture-removing hot air drier (Matsui Seisaku-sho's "DMZ2"), at a hot air temperature of 150 degrees Celsius and at a dew point of −36 degrees Celsius. Next, the mixture was fed into a double-screw extruder (by Technovel); and with adding thereto a mat agent, "AEROSIL 200V" (0.016-μm silica fine particles by Nippon Aerosil) through the additive hopper port provided in the intermediate part of the extruder via a continuous feeder so that its throughput flow could be 0.05%, and also thereto, a UV absorbent, "TINUVIN 360" (by Ciba Specialty Chemicals) is added through the same port to be at a throughput flow of 0.5%, the mixture was melt-extruded. Thus melt-extruded, the film formed had a thickness of 180 μm.

The film was biaxially stretched at a temperature of 142 degrees Celsius in MD by 1.1 times and in TD by 2.2 times. This was used as Film 16. The thickness of the film was 74 μm.

In this Example, the film starting from cellulose acylate propionate (CAP) was produced according to a melt extrusion method; however, the inventor confirmed that, needless-to-say, films having the same property could also be produced according a solution casting method and they exhibited the same effect (however, in consideration of the solubility of CAP in dope preparation, CAP having a degree of acetyl substitution of 1.6 and a degree of propionyl substitution of 0.9 was used as the starting material).

(17) Preparation of Film 17:

The norbornene film built in Toshiba's liquid-crystal panel "32C7000" was peeled, and an easy-adhesion layer was formed on the film. This was used as Film 17. The thickness of the film was 70 μm.

(18) Preparation of Film 18:

A cellulose acylate-base film was prepared in the same manner as Film 9, except that the ratio of each ingredient and the condition of preparing the film were changed as shown in the following table. This was used as Film 18. The abbreviations of the additive and the plasticizer mentioned below are the same as above.

|  | Cellulose acylate film | Film 18 |
| --- | --- | --- |
| Cellulose Acylate | Cellulose Type | CTA |
|  | Total degree of substitution | 2.81 |
|  | Ratio of 6-position substitution | 0.320 |
|  | Degree of 6-position substitution | 0.9 |
|  | Substituent | Ac |
| Additive | Additive Type | Retardation enhancer (1) |
|  | Amount [parts by mass relative to 100 parts by mass of cellulose] | 6.4 |
| Plasticizer | Plasticizer Type | TPP/BDP |
|  | Amount [parts by mass relative to 100 parts by mass of cellulose] | 7.8/3.9 |
| Stretching condition | Ratio of longwise stretching [%] | 3 |
|  | Ratio of cross stretching [%] | 35 |
|  | Ratio of shrinking [%] | 7 |
|  | Stretching speed [%/min] | 35 |
|  | Film surface temperature [° C.] | 120 |
|  | Amount of residual solvent at the time of peeling off [%] | 50 |
|  | Amount of residual solvent at the time of termination of stretching [%] | 10 |

(19) Preparation of Film 19:

(Cellulose Acylate Solution for Low-Substitution Layer)

The following ingredients were put into a mixing tank and stirred under heat to dissolve the ingredients, thereby preparing a cellulose acylate solution for low-substitution layer.

| Cellulose acetate having a degree of substitution of 2.43 | 100.0 mas. pts. |
| Retardation enhancer (1) | 4.0 mas. pts. |
| Retardation enhancer (2) | 10.0 mas. pts. |
| Methylene chloride | 351.5 mas. pts. |
| Methanol | 52.5 mas. pts. |

(Cellulose Acylate Solution for High-Substitution Layer)

The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 82 μm from the cellulose acylate solution for low-substitution layer and to form a skin layer A and a skin layer B each having a thickness of 2 μm from the cellulose acylate solution for high-substitution layer. The formed film was peeled away from the band, clipped, and stretched in the transverse direction by 18% at a stretching temperature of 180 degrees Celsius by a tenter while the residual solvent amount was 20% relative to the total mass of the film, using a tenter. Next, the film was unclipped and dried at 130 degrees Celsius for 20 minutes, thereby giving a film. And this was used as Film 19.

(20) Preparation of Film 20:

<Production of Cyclic Polyolefin Polymer P-1>

100 parts by mass of pure toluene and 100 parts by mass of methyl norbornenecarboxylate were put into a reactor. Next, 25 mmol % (relative to monomer) of Ni ethylhexanoate dissolved in toluene, 0.225 mol % (relative to monomer) of tri(pentafluorophenyl)boron, and 0.25 mol % (relative to monomer) of triethylaluminium dissolved in toluene were put into the reactor. These were reacted for 18 hours with stirring at room temperature. After the reaction, the reaction mixture was put into excessive ethanol, and the polymer precipitate was formed therein. The precipitate was purified, and the thus-obtained cyclic olefin polymer (P-1) was dried in vacuum at 65 degrees Celsius for 24 hours.

The obtained polymer was dissolved in tetrahydrofuran, and its molecular weight was measured through gel permeation chromatography. The number-average molecular weight of the polymer, in terms of polystyrene, was 79,000, and the weight-average molecular weight thereof was 205,000. Using an Abbe's refractometer, the refractive index of the obtained polymer was measured, and was 1.52.

(Polyolefin Dope D-1)

| | |
|---|---|
| Cyclic polyolefin polymer P-1 | 150 mas. pts. |
| Additive, polymethyl acrylate (Soken Chemical's "Actflow UMM1001", having a weight-average molecular weight of about 1000) | 7.5 mas. pts. |
| Antioxidant, Ciba Specialty Chemicals' "Irganox 1010" | 0.45 mas. pts. |
| Dichloromethane | 620 mas. pts. |

The above composition was put into a mixing tank and stirred to dissolve the ingredients, and the resulting solution was filtered through a paper filter having a mean pore size of 34 μm and through a sintered metal filter having a mean pore size of 10 μm, thereby preparing a cyclic polyolefin dope D-1. The dope was cast on a band caster. The film having a residual solvent amount of about 30% by mass was peeled away from the band, and using a tenter, this was dried with hot air at 140 degrees Celsius applied thereto. Afterwards, the tenter transfer was changed to roll transfer, and the film was further dried at from 120 degrees Celsius to 140 degrees Celsius, and wound up. This was used as Film 20. The film had a thickness of 80 μm.

(21) Preparation of Film 21:

Cellulose acetate benzoate 21A was produced according to the production method for comparative compound C-3 described in JP-A 2008-95027, for which, however, 4-methoxycinnamic acid chloride used as the intermediate 2 in the method was changed to benzoyl chloride.

<Preparation of Cellulose Acylate Solution>

The following ingredients were put into a mixing tank and stirred under heat to dissolve the ingredients, thereby preparing a solution containing a cellulose acylate solution.

| Cellulose Acylate Solution | |
|---|---|
| Cellulose acetate benzoate 21A | 100.0 mas. pts. |
| Methylene chloride | 403.0 mas. pts. |
| Methanol | 60.2 mas. pts. |

Thus prepared, the cellulose acylate solution was immediately cast on a band caster. The film having a residual solvent amount of about 30% by mass was peeled away, and using a tenter, this was dried with hot air at 160 degrees Celsius applied thereto.

Further, the film was monoaxially stretched by 1.5 times at a temperature of 160 degrees Celsius with its edges kept fixed. This was used as Film 21. The thickness of the film was 55 μm.

(22) Preparation of Film 22:

(Cellulose Acylate Solution for Low-Substitution Layer)

The following ingredients were put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 18.5 mas. pts. |
| Methylene chloride | 365.5 mas. pts. |
| Methanol | 54.6 mas. pts. |

(Cellulose Acylate Solution for High-Substitution Layer)

The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 38 μm from the cellulose acylate solution for low-substitution layer and to form a skin layer A and a skin layer B each having a thickness of 2 μm from the cellulose acylate solution for high-substitution layer. The formed film was peeled away from the band, and while the residual solvent amount was 20% relative to the total mass of the film, this was dried at a temperature of 200 degrees Celsius for 30 minutes and then at 130 degrees Celsius for 20 minutes, thereby giving a film. And this was used as Film 22.

2. Properties of Films 1-22:

The properties of Films 1-22 are shown in the following Table. Re(550) and Rth(550) of each film were measured as follows: A sample having a size of 30 mm×40 mm of each film was conditioned at 25 degrees Celsius and 60% RH for 2 hours, and analyzed with KOBRA 21ADH (by Oji Scientific Instruments) at a wavelength of 550 nm. For Films 1, 5, 6, 8-16, 18, 19, 21 and 22, an assumed mean refractive index of 1.48 and the film thickness were inputted and the data were computed. For the other films, the assumed refractive index was 1.53 for Films 3, 7 and 17, 1.50 for Film 2, and 1.52 for Films 4 and 20.

|  | Thickness (μm) | Re(550) (nm) | Rth(550) (nm) |
| --- | --- | --- | --- |
| Film 1 | 60 | 1.0 | −1.1 |
| Film 2 | 30 | 0.8 | 1.4 |
| Film 3 | 60 | 1.8 | 3.2 |
| Film 4 | 50 | 1.8 | 3.1 |
| Film 5 | 80 | 1.3 | 10 |
| Film 6 | 80 | 0.8 | 43 |
| Film 7 | 45 | 0.2 | 43 |
| Film 8 | 34 | 2.1 | 43 |
| Film 9 | 78 | 3.0 | 90 |
| Film 10 | 78 | 3.0 | 95 |
| Film 11 | 87 | 3.0 | 100 |
| Film 12 | 86 | 3.1 | 105 |
| Film 13 | 74 | 90 | 150 |
| Film 14 | 78 | 83 | 165 |
| Film 15 | 118 | 61 | 208 |
| Film 16 | 74 | 61 | 208 |
| Film 17 | 70 | 61 | 208 |
| Film 18 | 82 | 61 | 208 |
| Film 19 | 86 | 60 | 250 |
| Film 20 | 80 | 30 | 250 |
| Film 21 | 55 | 275 | −69 |
| Film 22 | 42 | 0.5 | 43 |

In the same manner, Re and Rth of the films in the following Table were measured at a wavelength of 450 nm, 550 nm and 630 nm.

|  | Re(nm) | | | Wavelength- | Rth(nm) | | | Wavelength- |
|  | 450 nm | 550 nm | 630 nm | dispersion *1 | 450 nm | 550 nm | 630 nm | dispersion *1 |
| --- | --- | --- | --- | --- | --- | --- | --- | --- |
| Film 6 | −3.3 | 0.8 | 3.2 | Reversed | 32 | 43 | 47 | Reversed |
| Film 7 | 0.2 | 0.2 | 0.2 | Flat | 43 | 43 | 43 | Flat |
| Film 8 | 2.6 | 2.1 | 1.7 | Normal | 54 | 43 | 40 | Normal |
| Film 15 | 58.5 | 61.0 | 62.0 | Reversed | 201.0 | 208.0 | 211.0 | Reversed |
| Film 16 | 52.0 | 61.0 | 65.5 | Reversed | 195.0 | 208.0 | 221.0 | Reversed |
| Film 17 | 61.0 | 61.0 | 61.0 | Flat | 208.0 | 208.0 | 208.0 | Flat |
| Film 18 | 64.5 | 61.0 | 60.0 | Normal | 214.0 | 208.0 | 207.5 | Normal |

*1 "reversed": Re or Rth shows the reversed wavelength-dispersion; "flat": Re or Rth is constant with wavelength variation; "normal": Re or Rth shows the normal wavelength-dispersion 3. Production of Polarizing Plate:

A polyvinyl alcohol (PVA) film having a thickness of 80 μm was dyed by dipping it in an aqueous iodine solution having an iodine concentration of 0.05% by mass at 30 degrees Celsius for 60 seconds, then stretched in the machine direction by 5 times the original length while dipped in an aqueous boric acid solution having a boric acid concentration of 4% by mass for 60 seconds, and thereafter dried at 50 degrees Celsius for 4 minutes to give a polarizing film having a thickness of 20 μm.

Of the films shown in the above Table, the films containing a cellulose acylate were saponified as follows: Each film was dipped in an aqueous sodium hydroxide solution (1.5 mol/liter) at 55 degrees Celsius, and then fully rinsed with water to remove sodium hydroxide. Next, this was dipped in an aqueous diluted sulfuric acid solution (0.005 mol/liter) at 35 degrees Celsius for 1 minute, and then dipped in water to fully remove the aqueous diluted sulfuric acid solution. Finally, the sample was fully dried at 120 degrees Celsius.

Any two sheets of the films (Films 1-22) were stuck, using an adhesive, with the polarizing film sandwiched therebetween to thereby produce a polarizing plate having a protective film on both surfaces. For the cellulose acylate films, a polyvinyl alcohol adhesive was used, and for the other films, an acrylic adhesive was used to stick them to the polarizing element. The combination is shown in Table below.

In the following Table, the film marked with "1" means a retardation film serving as a protective film for polarizing plate, as disposed further outside toward the panel side than the polarizing film; the film marked with "*2" means a retardation film serving as a protective film for polarizing plate, as disposed between the liquid-crystal cell and the polarizing film; and the film marked with "*3" means a retardation film serving as a protective film for polarizing plate, as disposed further outside toward the backlight side than the polarizing film. The same shall apply to all the following Tables.

Films 13-22 were so stuck that the in-plane slow axis thereof could be in parallel to the transmission axis of the polarizing element; and Films 1-12 were so stuck that the in-plane slow axis thereof could be orthogonal to the transmission axis of the polarizing element. The films having an easy-adhesion layer were so stuck that the easy-adhesion layer therein could face the surface side of the polarizing element.

4. Production and Evaluation of VA-Mode Liquid-Crystal Display Device:

(1) Preparation of VA-Mode Liquid-Crystal Cells 1 to 5:

In this Example, in case where a color filter is formed on a TFT, an organic developer CD2000 (by FUJIFILM Electronic Materials) was used.

(1)-1 Preparation of VA-Mode Liquid-Crystal Cell 1:

According to Example 20 described in JP-A 2009-141341, a TFT element was formed on a glass substrate, and a protective film was further formed on the TFT element.

Subsequently, a contact hole was formed in the protective film, and a transparent electrode of ITO electrically connected to the TFT element was formed on the protective film, thereby producing an array substrate.

Subsequently, using a coloring photosensitive composition prepared according to Examples 17, 18 and 19 in JP-A 2009-144126 and according to the process of Example 9a in JP-T 2008-516262, [0099]-[0103], a color-filter-on-array (COA) substrate was formed on the above protective film. If desired, the retardation enhancer of formula (X) and/or the retardation reducer of formula (X1) was added to the coloring photosensitive composition. In this, however, the concentration of the pigment in the coloring photosensitive resin composition for each pixel was halved, and an amount of the coating composition was controlled so that the black pixel could have a thickness of 4.2 μm and the red pixel, the green pixel, and the blue pixel could have a thickness of 3.5 μm each.

Rth(450), Rth(550) and Rth(630) of the prepared COA substrate were measured with AXOMETRICS' AXOSCAN using the associated software. The obtained values of Rth (450), Rth(550) and Rth(630) are shown in the table.

Further, a contact hole was formed in the color filter, and then, a transparent pixel electrode of ITO (indium tin oxide), as electrically connected to the TFT element, was formed on the color filter. Next, according to Example 1 in JP-A 2006-64921, a spacer was formed on the ITO film in the area corresponding to the upper part of the partitioning wall (black matrix).

Separately, a glass substrate was prepared with a transparent electrode of ITO formed thereon, as a counter substrate. The transparent electrodes of the COA substrate and the counter substrate was patterned for PVA mode, respectively, and a vertical alignment film of polyimide was formed on each of them.

Afterwards, a UV-curable resin sealant was applied to the position corresponding to the black matrix frame disposed in the periphery to surround the RGB pixel group of the color filter, according to a dispenser system, then a PVA-mode liquid crystal was dropwise applied thereto, and this was stuck to the counter substrate. The thus-stuck substrates were irradiated with UV and heat-treated to cure the sealant. According to the process, a liquid-crystal cell was produced.

Subsequently, Δnd(550) of the thus-produced liquid-crystal cell was measured with AXOMETRICS' AXOSCAN using the associated software, and the cell, of which Δnd(550) is 300 nm, was selected. This was used as Liquid-crystal Cell 1.

As the light source for Liquid-crystal Cell 1, used was the backlight used in the above LCD-40MZW100, and the light source was disposed on the side of the COA substrate.

(1)-2 Preparation of VA-Mode Liquid-Crystal Cell 2:

According to Example 20 described in JP-A 2009-141341, a TFT element was formed on a glass substrate, and a protective film was further formed on the TFT element. Subsequently, a contact hole was formed in the protective film, and a transparent electrode of ITO electrically connected to the TFT element was formed on the protective film, thereby producing an array substrate.

Subsequently, a coloring photosensitive composition was prepared according to Examples 17, 18 and 19 in JP-A 2009-144126. If desired, the retardation enhancer of formula (X) and/or the retardation reducer of formula (X1) was added to the coloring photosensitive composition. Using the coloring photosensitive composition a color filter substrate was prepared according to the process of Example 9a in JP-T 2008-516262, [0099]-[0103].

Rth(450), Rth(550) and Rth(630) of the prepared color filter substrate were measured with AXOMETRICS' AXOSCAN using the associated software. The obtained values of Rth(450), Rth(550) and Rth(630) are shown in the table.

A transparent electrode of ITO was formed through sputtering on the color filter substrate formed in the above, and then according to Example 1 in JP-A 2006-64921, a spacer was formed in the part corresponding to the upper part of the partition wall (black matrix).

Separately, the transparent electrodes of the prepared array- and color-filter-substrates were patterned for PVA mode respectively, and a vertical alignment film of polyimide was formed on each of them.

Afterwards, a UV-curable resin sealant was applied to the position corresponding to the black matrix frame disposed in the periphery to surround the RGB pixel group of the color filter, according to a dispenser system, then a PVA-mode liquid crystal was dropwise applied thereto, and this was stuck to the counter substrate. The thus-stuck substrates were irradiated with UV and heat-treated to cure the sealant. According to the process, a liquid-crystal cell was produced.

Subsequently, Δnd(550) of the thus-produced liquid-crystal cell was measured with AXOMETRICS' AXOSCAN using the associated software, and the cell, of which Δnd(550) is 300 nm, was selected. This was used as Liquid-crystal Cell 2.

As the light source for Liquid-crystal Cell 2, used was the backlight used in the above LCD-40MZW100, and the light source was disposed on the side of the array-substrate.

(1)-3 Preparation of VA-Mode Liquid-Crystal Cell 3:

Liquid-crystal Cell 3 was prepared in the same manner as Liquid-crystal Cell 1, except that an amount of the agent for controlling retardation in the coloring photosensitive composition, which was prepared according to Example 18 described in JP-A-2009-144126, was changed.

Subsequently, Δnd(550) of the thus-produced liquid-crystal cell was measured with AXOMETRICS' AXOSCAN using the associated software, and the cell, of which Δnd(550) is 300 nm, was selected. This was used as Liquid-crystal Cell 3.

Rth(450), Rth(550) and Rth(630) of the COA substrate used in preparing Liquid-crystal Cell 3 were measured with AXOMETRICS' AXOSCAN using the associated software. The obtained values of Rth(450), Rth(550) and Rth(630) are shown in the table.

As the light source for Liquid-crystal Cell 3, used was the backlight used in the above LCD-40MZW100, and the light source was disposed on the side of the COA substrate.

(1)-4 Preparation of VA-Mode Liquid-Crystal Cell 4:

Liquid-crystal Cell 4 was prepared in the same manner as Liquid-crystal Cell 2, except that an amount of the agent for controlling retardation in the coloring photosensitive composition, which was prepared according to Example 18 described in JP-A-2009-144126, was changed.

Subsequently, Δnd(550) of the thus-produced liquid-crystal cell was measured with AXOMETRICS' AXOSCAN using the associated software, and the cell, of which Δnd(550) is 300 nm, was selected. This was used as Liquid-crystal Cell 4.

Rth(450), Rth(550) and Rth(630) of the COA substrate used in preparing Liquid-crystal Cell 4 were measured with AXOMETRICS' AXOSCAN using the associated software. The obtained values of Rth(450), Rth(550) and Rth(630) are shown in the table.

As the light source for Liquid-crystal Cell 3, used was the backlight used in the above LCD-40MZW100, and the light source was disposed on the side of the COA substrate.

(1)-5 Preparation of VA-Mode Liquid-Crystal Cell 5:

Liquid-crystal Cell 4 was prepared in the same manner as Liquid-crystal Cell 1, except that an amount of the agent for controlling retardation in the coloring photosensitive composition, which was prepared according to Examples 17 and 19 described in JP-A-2009-144126, was changed.

Subsequently, Δnd(550) of the thus-produced liquid-crystal cell was measured with AXOMETRICS' AXOSCAN using the associated software, and the cell, of which Δnd(550) is 300 nm, was selected. This was used as Liquid-crystal Cell 5.

Rth(450), Rth(550) and Rth(630) of the COA substrate used in preparing Liquid-crystal Cell 5 were measured with AXOMETRICS' AXOSCAN using the associated software. The obtained values of Rth(450), Rth(550) and Rth(630) are shown in the table.

As the light source for Liquid-crystal Cell 3, used was the backlight used in the above LCD-40MZW100, and the light source was disposed on the side of the COA substrate.

| Liquid Crystal Cell | COA/Non-COA | Rth$_{CF}$(450) (nm) | Rth$_{CF}$(550) (nm) | Rth$_{CF}$(630) (nm) | Wavelength-dispersion *1 |
|---|---|---|---|---|---|
| Liquid Crystal Cell 1 | COA | 0 | 0 | 0 | Flat |
| Liquid Crystal Cell 2 | Non-COA | 0 | 0 | 0 | Flat |
| Liquid Crystal Cell 3 | COA | 0 | −10 | 0 | — |
| Liquid Crystal Cell 4 | Non-COA | 0 | −10 | 0 | — |
| Liquid Crystal Cell 5 | COA | −7.8 | 0 | 6.3 | Reversed |

*1 "reversed": Rth shows the reversed wavelength-dispersion; "flat": Rth is constant with wavelength variation.

(2) Computation of Member Contrast Ratios of the Front-Side Substrate and the Rear-Side Substrate of the Liquid-Crystal Cell:

The member contrast ratio of the rear-side substrate and the front-side substrate of the liquid-crystal cell is meant to indicate the total contrast ratio of each substrate and each member formed on each substrate. Examples of the member include all members of color filter, black matrix, array member (TFT array, etc.), projection on substrate, common electrode, slit, etc.

Two substrates or that is the front-side substrate and the rear-side substrate to form each liquid crystal cell were separated from each other to the individual front-side substrate and rear-side substrate; and each substrate was washed with ethanol. Subsequently, the member contrast ratio of the front-side substrate (including the front-side substrate and all the members formed on the substrate), and that of the rear-side substrate (including the rear-side substrate and all the members formed on the substrate) were computed according to the following method.

A polarizing plate (HLC2-2518, by Sanritz) was put on the backlight of a liquid-crystal panel, Sharp's LC-32GH5, and on this, the front-side substrate or the rear-side substrate prepared by disassembling each liquid-crystal cell, as fitted to a rotary stage SGSP-120YAW (by Sigma Koki), was disposed in parallel to each other at a distance of 2 mm from the polarizing plate. Briefly, these were so disposed that the TFT array wiring on the substrate and the lattice pattern of the black matrix could correspond to the polarization axis of the polarizing plate. Further on this, a polarizing plate, HLC2-2518 (by Sanritz) fitted to a rotary stage was disposed so that the distance between the polarizing plates could be 52 mm. Using a tester BM5A (by TOPCON) in a dark room, the brightness in the black and white states of display in the normal direction was measured, and the front contrast ratio A (white brightness/black brightness) was computed. In this, the polarizing plate was rotated, and the lowest brightness was the brightness in the black state. Then, the polarizing plate was rotated by 90 degrees, and the brightness in this stage was the brightness in the white state.

Next, in the above embodiment, the front-side substrate or the rear-side substrate was removed, and the brightness in the black or white state of display with the polarizing plate alone was measured, and the front contrast ratio B was computed.

To remove the influence of the front contrast ratio (CR) B with the polarizing plate on the front contrast ratio (CR) A, the member contrast ratio was computed according to the following formula:

The member contrast ratio=1−(1/The front CR$A$−1/The front CR$B$).

Regarding each of the liquid crystal cells, the ratio of the member contrast of the front-side substrate to the member contrast of the rear-side substrate was calculated, and it was found that the ratio of each of Liquid-crystal Cells 1, 3 and 5 was 51.0; and that the ratio of each of f Liquid-crystal Cells 2 and 4 was 1.1.

(3) Evaluation of VA-mode Liquid Crystal Display Device:

Thus constructed, the liquid-crystal display devices were evaluated as follows:

(3)-1 Measurement of Front Contrast Ratio Ratio:

Using a tester BM5A (by TOPCON) in a dark room, the brightness in the black and white states of display in the normal direction to the panel was measured, and from the data, the front contrast ratio (white brightness/black brightness) was computed.

In this, the distance between the tester and the panel was 700 mm.

Subsequently, on the basis of the front contrast ratio in the standard state, the front contrast ratio was computed according to the following formula:

Front Contrast Ratio=(The front contrast ratio in practical state)/(The front contrast ratio in standard state).

Regarding the standard state of each liquid-crystal cell, the liquid-crystal display device comprising Liquid-crystal Cell 1 or 2 is based on the liquid-crystal display device of Comparative Example 1; the liquid-crystal display device comprising Liquid-crystal Cell 3 or 4 is based on the liquid-crystal display device of Comparative Example 8; and the liquid-crystal display device comprising Liquid-crystal Cell 5 is based on the liquid-crystal display device of Comparative Example 19. The front contrast ratio of the liquid-crystal display of Comparative Example 1 was 3050; that of the liquid-crystal display device of Comparative Example 8 was 3010; and that of the liquid-crystal display device of Comparative Example 19 was 3050.

(3)-2 Viewing Angle Contrast Ratio (Contrast Ratio in Oblique Direction):

Using a tester BM5A (by TOPCON) in a dark room, the brightness in the black and white states of display was measured in three directions from the front of the device at a polar angle of 60 degrees and at an azimuth angle of 0 degree, 45 degrees or 90 degrees. From the data, the viewing angle contrast ratio (white brightness/black brightness) was computed, and the viewing angle characteristics of the liquid-crystal display devices were evaluated as follows:

A: The viewing angle contrast ratio is equal to or more than 50 in every direction, and no light leakage is recognized.

B: The minimum value of the viewing angle contrast ratio is equal to or more than 25 and less than 50, and slight light leakage is recognized but on an acceptable level.

C: The minimum value of the viewing angle contrast ratio is less than 25, and significant light leakage is recognized on an unacceptable level.

(3)-3 Circular Unevenness:

The produced liquid-crystal display devices were left in an environment at a temperature of 40 degrees Celsius and a relative humidity of 90% for 4 days. After thus aged, the devices were transferred into an environment at a temperature of 36 degrees Celsius and a relative humidity of 30%.

Afterwards, the panel was put on a light table, observed in a dark room, and evaluated for the circular unevenness according to the criteria mentioned below.

AA: Within 60 hours after the panel was put on the lighted light table, no light leakage was seen.

A: Some light leakage was seen, but disappeared within 30 hours after the panel was put on the lighted light table, and thereafter no light leakage was seen.

B: Light leakage was seen, and did not disappear within 30 hours after the panel was put on the lighted light table, but thereafter disappeared within 60 hours.

C: Light leakage was seen, and did not disappear within 60 hours after the panel was put on the lighted light table (unacceptable).

(3)-4 Front Blackness:

Using a tester BM5A (by TOPCON) in a dark room, the panels were checked for the color shift in the black state in panel normal direction, and color shift in blue was seen. The panels were evaluated for the front blackness based on the value v' indicating blue. In this, the distance between the tester and the panel was 700 mm.

A: v' is equal to or more than 0.38, and no color shift in blue in the front is recognized.

B: v' is from 0.375 to less than 0.38, and slight color shift in blue in the front is recognized but on an acceptable level.

C: v' is less than 0.375, and color shift in blue is recognized on an unacceptable level.

The results are shown in the following Table.

| No. | Front-side Film*1 | Front-side Film*2 (Rth) | Liquid Crystal Cell | Rth(550) of CF(G) *6 | Rear-side Film*2 (Rth) | Rear-side Film *3 | (I) *4 | Front CR | Viewing Angle CR *5 | Front Blackness (v' value) | Circular Unevenness |
|---|---|---|---|---|---|---|---|---|---|---|---|
| Example 1 | 6 | 19 (250 nm) | 1(COA) | 0 nm | 1 (−1.1 nm) | 6 | ○ | 121% | A | — | AA |
| Example 2 | 6 | 15 (208 nm) | 1(COA) | 0 nm | 6 (43 nm) | 6 | ○ | 117% | A | — | A |
| Example 3 | 6 | 20 (250 nm) | 1(COA) | −10 nm | 21 (−69 nm) | 6 | ○ | 122% | A | — | — |
| Example 4 | 6 | 14 (165 nm) | 1(COA) | 0 nm | 9 (90 nm) | 6 | ○ | 102% | A | — | A |
| Example 5 | 6 | 19 (250 nm) | 3(COA) | −10 nm | 5 (10 nm) | 6 | ○ | 121% | A | — | AA |
| Example 6 | 6 | 15 (208 nm) | 3(COA) | −10 nm | 8 (43 nm, N *7) | 6 | ○ | 118% | A | B (0.375) | — |
| Example 7 | 6 | 15 (208 nm) | 3(COA) | −10 nm | 7 (43 nm, F *7) | 6 | ○ | 118% | A | A (0.381) | — |
| Example 8 | 6 | 15 (208 nm, R *7) | 3(COA) | −10 nm | 6 (43 nm, R *7) | 6 | ○ | 118% | A (64) | A (0.385) | A |
| Example 9 | 6 | 17 (208 nm, F *7) | 3(COA) | −10 nm | 6 (43 nm) | 6 | ○ | 118% | A (63) | — | — |
| Example 10 | 6 | 18 (208 nm, N *7) | 3(COA) | −10 nm | 6 (43 nm) | 6 | ○ | 118% | A (62) | — | — |
| Example 11 | 6 | 16 (208 nm) | 3(COA) | −10 nm | 6 (43 nm) | 6 | ○ | 118% | A | — | — |
| Example 12 | 6 | 15 (208 nm) | 3(COA) | −10 nm | 22 (43 nm) | 6 | ○ | 118% | A | — | — |
| Example 13 | 6 | 13 (150 nm) | 3(COA) | −10 nm | 11 (100 nm) | 6 | ○ | 101% | A | — | — |
| Example 14 | 6 | 15 (208 nm) | 5(COA) | 0 nm | 8 (43 nm, N *7) | 6 | ○ | 117% | A | B (0.380) | — |
| Example 15 | 6 | 15 (208 nm) | 5(COA) | 0 nm | 7 (43 nm, F *7) | 6 | ○ | 117% | A | A (0.386) | — |
| Example 16 | 6 | 15 (208 nm) | 5(COA) | 0 nm | 6 (43 nm, R *7) | 6 | ○ | 117% | A | A (0.390) | — |

*4: "○" means that formula (I) of |Rth$_{CF}$(550) + Rth$_{rear}$(550)| ≤ 90 nm is satisfied.
*5: The parenthesized numerical value is the contrast ratio value measured in the direction defined with a polar angle of 60 degrees and an azimuth angle of 45 degrees.
*6: indicating Rth(550) of the color filter.
*7: for indicating the wavelength dispersion characteristics of Re and Rth, and "R" means the reversed wavelength dispersion characteristics, "F" means that Re or Rth is constant with wavelength variation, and "N" means the normal wavelength dispersion characteristics.

| No. | Front-side Film*1 | Front-side Film*2 (Rth) | Liquid Crystal Cell | Rth(550) of CF(G) *6 | Rear-side Film*2 (Rth) | Rear-side Film *3 | (I) *4 | Front CR | Viewing Angle CR *5 | Front Blackness (v' value) | Circular Unevenness |
|---|---|---|---|---|---|---|---|---|---|---|---|
| Comparative Example 1 | 6 | 14 (165 nm) | 1(COA) | 0 | 10 (95 nm) | 6 | X | 100% | A | — | B |
| Comparative Example 2 | 6 | 6 (43 nm) | 1(COA) | 0 | 15 (208 nm) | 6 | X | 87% | A | — | C |
| Comparative Example 3 | 6 | 19 (250 nm) | 2(Non-COA) | 0 | 1 (−1.1 nm) | 6 | ○ | 94% | A | — | A |
| Comparative Example 4 | 6 | 15 (208 nm) | 2(Non-COA) | 0 | 6 (43 nm) | 6 | ○ | 96% | A | — | B |
| Comparative Example 5 | 6 | 14 (165 nm) | 2(Non-COA) | 0 | 9 (90 nm) | 6 | ○ | 99% | A | — | C |
| Comparative Example 6 | 6 | 14 (165 nm) | 2(Non-COA) | 0 | 10 (95 nm) | 6 | X | 101% | A | — | C |

-continued

| No. | Front-side Film*1 | Front-side Film*2 (Rth) | Liquid Crystal Cell | Rth(550) of CF(G) *6 | Rear-side Film*2 (Rth) | Rear-side Film *3 | (I) *4 | Front CR | Viewing Angle CR *5 | Front Blackness (v' value) | Circular Unevenness |
|---|---|---|---|---|---|---|---|---|---|---|---|
| Comparative Example 7 | 6 | 6 (43 nm) | 2(Non-COA) | 0 | 15 (208 nm) | 6 | X | 99% | A | — | C |
| Comparative Example 8 | 6 | 13 (150 nm) | 3(COA) | −10 | 12 (105 nm) | 6 | X | 100% | A | — | — |
| Comparative Example 9 | 6 | 6 (43 nm, R *7) | 3(COA) | −10 | 15 (208 nm) | 6 | X | 88% | A (58) | C | — |
| Comparative Example 10 | 6 | 19 (250 nm) | 4(Non-COA) | −10 | 5 (10 nm) | 6 | ○ | 94% | A | — | A |
| Comparative Example 11 | 6 | 15 (208 nm) | 4(Non-COA) | −10 | 8 (43 nm) | 6 | ○ | 95% | A | C | — |
| Comparative Example 12 | 6 | 15 (208 nm) | 4(Non-COA) | −10 | 7 (43 nm) | 6 | ○ | 95% | A | C | — |
| Comparative Example 13 | 6 | 15 (208 nm, R *7) | 4(Non-COA) | −10 | 6 (43 nm) | 6 | ○ | 95% | A (60) | C | B |
| Comparative Example 14 | 6 | 17 (208 nm, F *7) | 4(Non-COA) | −10 | 6 (43 nm) | 6 | ○ | 95% | A (60) | — | — |
| Comparative Example 15 | 6 | 18 (208 nm, N *7) | 4(Non-COA) | −10 | 6 (43 nm) | 6 | ○ | 95% | A (59) | — | — |
| Comparative Example 16 | 6 | 13 (150 nm) | 4(Non-COA) | −10 | 11 (100 nm) | 6 | ○ | 99% | A | — | — |
| Comparative Example 17 | 6 | 13 (150 nm) | 4(Non-COA) | −10 | 12 (105 nm) | 6 | X | 100% | A | — | — |
| Comparative Example 18 | 6 | 6 (43 nm) | 4(Non-COA) | −10 | 15 (208 nm) | 6 | X | 99% | A | — | — |
| Comparative Example 19 | 6 | 14 (165 nm) | 3(COA) | 0 | 10 (95 nm) | 6 | X | 100% | A | — | — |

*4: "○" means that formula (I) of |$Rth_{CF}(550) + Rth_{rear}(550)$| ≤ 90 nm is satisfied; and "X" means that formula (I) of |$Rth_{CF}(550) + Rth_{rear}(550)$| ≤ 90 nm is satisfied.
*5: The parenthesized numerical value is the contrast ratio value measured in the direction defined with a polar angle of 60 degrees and an azimuth angle of 45 degrees.
*6: indicating Rth(550) of the color filter.
*7: for indicating the wavelength dispersion characteristics of Re and Rth, and "R" means the reversed wavelength dispersion characteristics, "F" means that Re or Rth is constant with wavelength variation, and "N" means the normal wavelength dispersion characteristics.

From the data shown in the tables, it is understandable that the VA-mode liquid crystal display devices of the invention employing the color filter and the retardation film disposed as the rear-side region, satisfying formula (I), and the COA liquid-crystal cell, exhibited the high front contrast ratio.

More specifically, respectively comparing the front CR of the examples of the invention with the front CR of the corresponding comparative examples employing any non-COA liquid crystal cell, it is understandable that the VA-mode liquid crystal display devices of the invention were remarkably excellent in terms of the front CR, compared with the corresponding VA-mode liquid crystal devices, employing any non-COA liquid crystal cell. For example, comparing the front CR of Examples 1, 2, 4 and 5 with the front CR of Comparative Examples 3, 4, 5 and 10 respectively, it is understandable that the VA-mode liquid crystal display devices of the invention were remarkably excellent in terms of the front CR.

Among the comparative examples not satisfying formula (I), comparing the effect of the comparative examples employing the COA liquid crystal cell with the effect of the comparative examples employing the non-COA liquid crystal cell, it is understandable that the effect of the invention is not obtainable only by employing the COA liquid crystal cell. For example, Comparative Examples 2 and 9 are the comparative examples employing the COA liquid crystal cell but not satisfying formula (1), and Comparative Examples 7 and 18 had the same structures respectively as Comparative Examples 2 and 9 except that they employed the non-COA liquid crystal. Although Comparative Examples 7 and 18 employed the COA liquid crystal cell, they were inferior to Comparative Examples 7 and 18 in terms of the front CR since they didn't satisfy formula (1). From the results, it is explicit that the effect of the invention can be obtained by not only employing a COA-liquid crystal cell but also employing the rear-side retardation region and the color filter, of which the total valued of Rth satisfies formula (1).

Furthermore, Examples 2 and 8 are the examples having the same structures as those of Comparative Examples 2 and 9 respectively except that the rear-side and front-side regions were exchanged. Since, in the comparative examples, the value of Rth of the rear-side retardation region was high and so didn't satisfy formula (1), the front CR was decreased rather than increased, despite that fact that the aperture ratio was expanded by employing the COA liquid crystal cell.

Among the examples of the invention, the VA-mode liquid crystal display devices of Examples 1 and 5, employing the retardation film disposed between the rear-side polarizing film and the COA liquid crystal cell, satisfying formula (Ia), were excellent in not only the front CR but also the circular unevenness.

On the other hand, the VA-mode liquid crystal display devices, employing the retardation film disposed between the rear-side polarizing film and the COA liquid crystal cell, satisfying formula (Ib), were excellent in the viewing-angle CR even though they employed the retardation film of which was Rth of about 200 nm as a front-side retardation region. Accordingly, it is understandable that the embodiments employing the retardation film, disposed between the rear-side polarizing film and the COA liquid crystal cell, satisfying formula (Ib), were excellent in not only the front CR but also the productivity as a whole including the front-side retardation film.

In the above Examples, Film 6, or that is a commercial TAC film, or Film 16 was used as the front-side and rear-side outer protective film; however, as the front-side and/or rear-side outer protective film, for example, any other cellulose acylate film (e.g., cellulose propionate, cellulose butyrate or the like film), or any other film comprising, as the main ingredient thereof, any of polyolefin (e.g., norbornene-based polymer), poly(meth)acrylate (e.g., polymethyl methacrylate), polycarbonate, polyester or polysulfone can also be used to attain the same effect; and any other commercial polymer film (Arton (by JSR) or Zeonor (by Nippon Zeon) or the like norbornene-based polymer film) may also be used to attain the same effect.

From the results shown in the table, it is understandable also as follows.

Comparison of Examples 6-8 and Examples 14-16:

Examples 6-8 (or Examples 14-16) employed the retardation film as the rear-side region, whose Rth was same each other but Rth had the normal wavelength dispersion characteristics, constant without any dependency of the wavelength and the reverse wavelength dispersion characteristics respectively; and other structures thereof were same. Comparing the front blackness thereof, it is understandable that blue-color shift in the front direction in the black state (color shift in the front direction in the black state) was reduced more and more in the order of the normal wavelength dispersion characteristics→the constant without dependency of the wavelength→the reverses wavelength dispersion characteristics.

Comparison of Examples 8-10:

Examples 8-10 employed the retardation film as the rear-side region, whose Rth was same each other but Rth had the normal wavelength dispersion characteristics, constant without any dependency of the wavelength and the reverse wavelength dispersion characteristics respectively; and other structures thereof were same. Comparing the viewing angle CR quantitatively, it is understandable that the viewing angle CR was improved more and more in the order of the normal wavelength dispersion characteristics→the constant without dependency of the wavelength→the reverses wavelength dispersion characteristics.

The invention claimed is:

1. A VA-mode liquid-crystal display device comprising:
a front-side polarizing element,
a rear-side polarizing element,
a liquid-crystal layer disposed between the front-side polarizing element and the rear-side polarizing element,
a color filter layer disposed between the liquid-crystal layer and the rear-side polarizing element, and
a rear-side retardation region composed of one or more retardation layers disposed between the rear-side polarizing element and the color filter layer;
wherein the total of retardation along the thickness-direction at a wavelength of 550 nm of the color filter layer, $Rth_{CF}(550)$, and retardation along the thickness-direction at a wavelength of 550 nm of the whole rear-side retardation region, $Rth_{rear}(550)$, satisfies following formula (I):

$$|Rth_{CF}(550)+Rth_{rear}(550)| \leq 90 \text{ nm, and} \quad (I)$$

wherein the liquid-crystal layer is sandwiched between an array substrate provided with the color filter layer and having a black matrix to partition pixels, and the counter substrate disposed to face the array substrate.

2. The VA-mode liquid-crystal display device of claim 1, wherein the rear-side retardation region satisfies the following formula (II):

$$|Re(550)| \leq 20 \text{ nm,} \quad (II)$$

wherein $Re(\lambda)$ means retardation (nm) in-plane at a wavelength of $\lambda$ nm of the region.

3. The VA-mode liquid-crystal display device of claim 1, wherein one or more layers disposed between the front-side polarizing element and the liquid-crystal layer (hereinafter the whole of one or more layers disposed between the front-side polarizing element and the liquid-crystal layer is referred to as "front-side retardation region") satisfy, as a whole, the following formulae (III) and (IV):

$$30 \text{ nm} \leq Re(550) \leq 90 \text{ nm,} \quad (III)$$

$$150 \text{ nm} \leq Rth(550) \leq 300 \text{ nm.} \quad (IV)$$

4. The VA-mode liquid-crystal display device of claim 1, wherein the rear-side retardation region satisfies the following formula (Ia):

$$|Rth(550)| \leq 20 \text{ nm.} \quad (Ia)$$

5. The VA-mode liquid-crystal display device of claim 4, wherein the front-side retardation region satisfies the following formulae (IIIa) and (IVa):

$$30 \text{ nm} \leq Re(550) \leq 90 \text{ nm,} \quad (IIIa)$$

$$180 \text{ nm} \leq Rth(550) \leq 300 \text{ nm.} \quad (IVa)$$

6. The VA-mode liquid-crystal display device of claim 1, wherein the rear-side retardation region satisfies the following formula (Ib):

$$20 \text{ nm} < |Rth(550)| \leq 90 \text{ nm.} \quad (Ib)$$

7. The VA-mode liquid-crystal display device of claim 6, wherein the front-side retardation region satisfies the following formulae (IIIb) and (IVb):

$$30 \text{ nm} \leq Re(550) \leq 90 \text{ nm,} \quad (IIIb)$$

$$150 \text{ nm} \leq Rth(550) \leq 270 \text{ nm.} \quad (IVb)$$

8. The VA-mode liquid-crystal display device of claim 1, wherein the rear-side retardation region satisfies the following two formulae:

$$|Rth(450)|/|Rth(550)| \leq 1, \text{ and}$$

$$1 \leq |Rth(630)|/|Rth(550)|.$$

9. The VA-mode liquid-crystal display device of claim 1, wherein the color filter layer is disposed inside the liquid-crystal cell and Rth of the color filter layer satisfies the following two formulae:

$$|Rth(450)|/|Rth(550)| \leq 1, \text{ and}$$

$$1 \leq |Rth(630)|/|Rth(550)|.$$

10. The VA-mode liquid-crystal display device of claim 1, wherein the rear-side retardation region is formed of a cellulose acylate-base film or comprises a cellulose acylate-base film.

11. The VA-mode liquid-crystal display device of claim 1, wherein the rear-side retardation region is formed of an acryl-base polymer film or comprises an acryl-base polymer film.

12. The VA-mode liquid-crystal display device of claim 11, wherein the rear-side retardation region is formed of an acryl-base polymer film containing an acryl-base polymer containing at least one unit selected from lactone ring units, maleic anhydride units and glutaric anhydride units, or contains the acryl-base polymer film.

13. The VA-mode liquid-crystal display device of claim 1, wherein the rear-side retardation region is formed of a cyclic olefin-base polymer film or contains a cyclic olefin-base polymer film.

14. The VA-mode liquid-crystal display device of claim 1, wherein the front-side retardation region is formed of one biaxial polymer film or contains one biaxial polymer film.

15. The VA-mode liquid-crystal display device of claim 1, wherein the front-side retardation region contains one monoaxial polymer film.

16. The VA-mode liquid-crystal display device of claim 14, wherein the one biaxial polymer film is a cellulose acylate-base film or a cyclic olefin-base polymer film.

17. The VA-mode liquid-crystal display device of claim 15, wherein the one monoaxial polymer film is a cellulose acylate-base film or a cyclic olefin-base polymer film.

18. The VA-mode liquid-crystal display device of claim 1, wherein the front contrast ratio is at least 1500.

* * * * *